(12) United States Patent
Sakaino

(10) Patent No.: US 12,515,322 B2
(45) Date of Patent: ***Jan. 6, 2026

(54) INFORMATION PROCESSING DEVICE, METHOD, AND PROGRAM

(71) Applicant: University of Tsukuba, Ibaraki (JP)

(72) Inventor: Sho Sakaino, Ibaraki (JP)

(73) Assignee: University of Tsukuba, Ibaraki (JP)

( * ) Notice: Subject to any disclaimer, the term of this patent is extended or adjusted under 35 U.S.C. 154(b) by 422 days.

This patent is subject to a terminal disclaimer.

(21) Appl. No.: 18/005,127

(22) PCT Filed: Jul. 9, 2021

(86) PCT No.: PCT/JP2021/025932
§ 371 (c)(1),
(2) Date: Jan. 11, 2023

(87) PCT Pub. No.: WO2022/014485
PCT Pub. Date: Jan. 20, 2022

(65) Prior Publication Data
US 2023/0256596 A1      Aug. 17, 2023

(30) Foreign Application Priority Data

Jul. 14, 2020   (JP) .................................. 2020-120740
Dec. 25, 2020  (JP) .................................. 2020-217788

(51) Int. Cl.
*B25J 9/16*          (2006.01)

(52) U.S. Cl.
CPC ................................. *B25J 9/163* (2013.01)

(58) Field of Classification Search
CPC ........................................................ B25J 9/163

USPC ............................................................ 700/47
See application file for complete search history.

(56) References Cited

U.S. PATENT DOCUMENTS

| | | | |
|---|---|---|---|
| 4,234,919 | A | 11/1980 | Bruce et al. |
| 7,453,227 | B2 | 11/2008 | Prisco et al. |
| 7,657,345 | B2 | 2/2010 | Endo et al. |
| 8,004,229 | B2 | 8/2011 | Nowlin et al. |

(Continued)

FOREIGN PATENT DOCUMENTS

| | | |
|---|---|---|
| JP | 2007276052 A | 10/2007 |
| JP | 2008304970 A | 12/2008 |

(Continued)

OTHER PUBLICATIONS

PCT Office, International Search Report issued in PCT/JP2021/025932 dated Sep. 7, 2021.

(Continued)

*Primary Examiner* — Md Azad
(74) *Attorney, Agent, or Firm* — Wood Herron & Evans LLP

(57) ABSTRACT

A first estimation unit (331) estimates command information per first unit of time using a first trained model (321). A second estimation unit (332) estimates, using a second trained model (322), the command information per second unit of time shorter than the first unit of time, from information corresponding to the command information derived by the first trained model (321). An operation control unit (333) operates a control target device (10B) using the command information estimated by the second estimation unit (332).

23 Claims, 28 Drawing Sheets

(56) References Cited

U.S. PATENT DOCUMENTS

| | | | |
|---|---|---|---|
| 8,541,970 | B2 | 9/2013 | Nowlin et al. |
| 9,114,530 | B2 | 8/2015 | Tsusaka et al. |
| 9,327,397 | B1 | 5/2016 | Williams et al. |
| 10,881,472 | B2 | 1/2021 | Sen et al. |
| 11,413,101 | B2 | 8/2022 | Sen et al. |
| 2006/0142657 | A1 | 6/2006 | Quaid et al. |
| 2007/0013336 | A1 | 1/2007 | Nowlin et al. |
| 2010/0274087 | A1 | 10/2010 | Diolaiti et al. |
| 2011/0264112 | A1 | 10/2011 | Nowlin et al. |
| 2013/0211587 | A1 | 8/2013 | Stephens, Jr. |
| 2013/0310977 | A1 | 11/2013 | Tsusaka et al. |
| 2014/0195052 | A1 | 7/2014 | Tsusaka et al. |
| 2015/0073595 | A1 | 3/2015 | Fudaba et al. |
| 2016/0062954 | A1 | 3/2016 | Ruff et al. |
| 2016/0207196 | A1 | 7/2016 | Ohnishi et al. |
| 2017/0036346 | A1 | 2/2017 | Kamioka |
| 2018/0222048 | A1 | 8/2018 | Hasegawa |
| 2018/0222057 | A1 | 8/2018 | Mizobe et al. |
| 2020/0139539 | A1* | 5/2020 | Hasunuma ............... G06N 3/08 |
| 2020/0285202 | A1* | 9/2020 | Fujishima ............. G06N 3/045 |
| 2020/0387162 | A1* | 12/2020 | Kobayashi ............ G05D 1/027 |
| 2021/0031365 | A1* | 2/2021 | Demirdjian ............. B25J 9/163 |
| 2021/0276187 | A1* | 9/2021 | Tang ........................ B25J 9/161 |
| 2022/0036302 | A1* | 2/2022 | Cella ...................... G06N 20/00 |
| 2022/0088775 | A1* | 3/2022 | Hasunuma ............ B25J 9/1661 |
| 2022/0105632 | A1* | 4/2022 | Oyama ................... B25J 9/163 |
| 2022/0152823 | A1* | 5/2022 | Hasunuma ............ G06N 3/084 |
| 2022/0331962 | A1* | 10/2022 | Pirk ....................... G06N 3/006 |

FOREIGN PATENT DOCUMENTS

| | | | |
|---|---|---|---|
| JP | 2009279699 A | 12/2009 | |
| JP | 2011224696 A | 11/2011 | |
| JP | 2020082332 A | 6/2020 | |
| JP | 2021016908 A | 2/2021 | |
| JP | 2021049841 A | 4/2021 | |
| JP | 2021064295 A | 4/2021 | |
| JP | 2021094677 A | 6/2021 | |
| WO | 2015041046 A1 | 3/2015 | |
| WO | 2016132398 A1 | 8/2016 | |

OTHER PUBLICATIONS

U.S. Patent and Trademark Office, Office Action issued in U.S. Appl. No. 15/733,744 dated Feb. 2, 2023.

PCT Office, Search Report and Written Opinion issued in PCT/JP2019/011693 dated Jun. 18, 2019.

European Patent Office, Extended Search Report issued in EP 19788436.4 dated Dec. 2, 2021.

Slama T et al: "Robust bilateral generalized predictive control for teleoperation systems", Control&Automation, 2007. Med Mediterranean Conference On, IEEE, PI, Jun. 1, 2007, 6 pages.

Ishiguro Yasuhiro et al: "Bilateral remote teaching and autonomous task execution with task progress feedback", Advanced Robotics, vol. 32, No. 6, Mar. 7, 2018, pp. 311-324.

Kyo Seinan et al: "Reproduction of motion obtained in bilateral control considering environment position", 2015 IEEE International Conference On Mechatronics (ICM), IEEE, Mar. 6, 2015, pp. 144-149.

Susa S et al: "Three-channel micro-macro bilateral control system with scaling of control gains", Industrial Electronics, 2008. IECON 2008. 34th Annual Conference of IEEE, IEEE, Piscataway, NJ, USA, Nov. 10, 2008 (Nov. 10, 2008), pp. 2598-2603.

Stein Matthew Ralph: "Behavior-based control for time-delayed teleoperation", Jan. 1, 1994, XP055864136, Retrieved from the Internet: URL:http://citeseerx.ist.psu.edu/viewdoc/download?doi=10.1.1.56.7856&rep=repl&type=pdf [retrieved on Nov. 22, 2021], 162 pages.

U.S. Patent and Trademark Office, Notice of Allowance issued in U.S. Appl. No. 15/733,744 dated Jun. 1, 2023.

* cited by examiner

ID, METHOD, AND PROGRAM

TECHNICAL FIELD

The present invention relates to an information processing device, method, and program.

BACKGROUND ART

A technique for controlling a robot is known. For example, Patent Document 1 describes a robot that is remotely controlled using a master-slave system. In addition, a technique has been proposed in which a trained model is generated through machine learning for remotely operating a robot using a master-slave system, and the robot is operated using the trained model.

CITATION LIST

Patent Document

Patent Document 1: WO 2015/041046

SUMMARY OF INVENTION

Technical Problem

In a case where a robot is operated using a trained model obtained through machine learning, when an operation condition (such as operation speed) or an operation environment (such as a shape or a position of an operation target, physical characteristics such as flexibility, or an obstacle position) changes, the robot may fail to appropriately operate. There has been a problem in that to stably predict an operation of the robot despite such a change in the operation condition or the operation environment, a large amount of training data and a large amount of calculation time are required.

An object of an aspect of the present invention is to control the operation of a control target device such as a robot and implement the target control device whose operation is stably predicted.

Solution to Problem

An information processing device according to a first aspect of the present invention includes: a first estimation unit configured to estimate command information per first unit of time, by using a first trained model that derives the command information to be supplied to a control target device from information indicating a state of the control target device, the information being output from the control target device that operates in accordance with the command information; a second estimation unit configured to estimate the command information per second unit of time shorter than the first unit of time, by using a second trained model that derives the command information to be supplied to the control target device from the information indicating the state output from the control target device and the command information derived as a result of input of the information indicating the state to the first trained model; and an operation control unit configured to operate the control target device by using the command information estimated by the second estimation unit.

With the configuration described above, the information processing device operates the control target device using the first trained model that derives the command information from the information indicating the state, and the second trained model that derives the command information from the information corresponding to the output of the first trained model. By hierarchically using this plurality of trained models in the operation control of the control target device, the operation of the control target device can be stably predicted without requiring a large amount of training data. While the trained models in two layers are described, models in n layers more than two layers may be used. In such a case, whether to use a model in each layer may be selected based on the object of the operation of the control target device.

With an information processing device according to a second aspect of the present invention, in the first aspect, the command information may be information to be issued from a device that outputs the command information, and information input to the second trained model includes the command information derived by the first trained model and the information indicating the command information and the state.

With the configuration described above, the input data for the second trained model is a set of the output from the first trained model estimated in the first unit of time and the state output from the control target device in the second unit of time. Since the first unit of time is set to be longer than the second unit of time, the second trained model can predict the operation of the control target device on the assumption that the variation in the output of the first trained model is small, whereby the prediction can be stably performed.

With an information processing device according to a third aspect of the present invention, in the first or the second aspect, the information input to the second trained model may be data as a result of reduction in a correlation on a set of the command information derived by the first trained model and the information indicating the state (conversion to achieve a lower correlation). For example, the correlation can be reduced by generating, using two data pieces, data on a sum and a difference between the two data pieces.

With the configuration described above, the correlation between the input data pieces for the second trained model is reduced. Thus, the operation of the control target device can be stably predicted. The lower the correlation between the data pieces, the more stable the prediction of the operation of the control target device.

With an information processing device according to a fourth aspect of the present invention, in the first to the third aspects, a device that outputs the command information and the control target device may each include a robot arm, and the command information and the information indicating the state may each include information indicating an operation of the robot arm.

With the configuration described above, the information processing device controls the operation of the control target device, using the hierarchical trained models that derive command information including information indicating the operation of the robot arm. Thus, the operation of the control target device including the robot arm can be stably predicted.

With an information processing device according to a fifth aspect of the present invention, in the first to the fourth aspects, a device that outputs the command information may be a master device that operates in accordance with a user operation, the control target device may be a slave device that operates in accordance with the command information output from the master device, and the first trained model and the second trained model may be trained using the command information and the information indicating the state that are collected in a master-slave system including the master device and the slave device.

With the configuration described above, the information processing device operates the control target device using a plurality of hierarchical trained models generated using the command information and the information indicating the state collected in the master-slave system. Thus, the operation of the control target device can be stably predicted.

An information processing device according to a sixth aspect of the present invention includes: a first generation unit configured to use a set of information indicating a state of a control target device that operates in accordance with command information and output from the control target device, and the command information to be supplied to the control target device, to generate a first trained model trained for a correlation between the information indicating the state and the command information; and a second generation unit configured to use a set of the command information to be supplied to the control target device and input information including information indicating a relationship between the information indicating the state output from the control target device and the command information derived as a result of input of the information indicating the state to the first trained model, to generate a second trained model trained for a correlation between the input information and the command information.

With the configuration described above, the information processing device generates the first trained model that derives the command information from the information indicating the state, and the second trained model that derives the command information from the information corresponding to the output of the first trained model. With this plurality of trained models with units of time for estimation hierarchically used for controlling the operation of the control target device, the first generation unit and the second generation unit can be operated independently. Thus, the first trained model and the second trained model can be independently derived, whereby the training and the prediction for the operation of the control target device can be stably performed, without requiring a huge amount of training data.

An information processing device according to a seventh aspect of the present invention may further include, in the sixth aspect: a first estimation unit configured to estimate the command information by inputting the information indicating the state output from the control target device, to the first trained model per first unit of time; a second estimation unit configured to estimate the command information by inputting, to the second trained model per second unit of time shorter than the first unit of time, input data including information indicating a relationship between the information indicating the state output from the control target device, and the command information derived as a result of input of the information indicating the state to the first trained model; and an operation control unit configured to operate the control target device by using the command information estimated by the second estimation unit.

With the configuration described above, the information processing device operates the control target device using the first trained model that derives the command information from the information indicating the state, and the second trained model that derives the command information from the information corresponding to the output of the first trained model. By hierarchically using this plurality of trained models in the operation control of the control target device, the operation of the control target device can be stably predicted without requiring a large amount of training data.

With an information processing device according to an eighth aspect of the present invention, in the sixth or the seventh aspect, a device that outputs the command information may be a master device that operates in accordance with a user operation, the control target device may be a slave device that operates in accordance with the command information output from the master device, the first generation unit may generate the first trained model using the command information and the information indicating the state that are collected in a master-slave system including the master device and the slave device, and the second generation unit may generate the second trained model using the command information and the information indicating the state that are collected in the master-slave system.

With the configuration described above, the information processing device generates a plurality of hierarchical trained models using the command information and the information indicating the state collected in the master-slave system. Since the master device operates in accordance with the user operation, information with which a person controls a delay in control on the slave device and dynamic interaction with the environment, through the master device, can be collected as the command information. By using this plurality of trained models in the operation control of the control target device, the operation of the control target device can be stably predicted.

With an information processing device according to a ninth aspect of the present invention, in the first to the eighth aspects, the first trained model may be a trained model that derives, from input data including the information indicating the state and information, including an operation speed, for defining an operation of the control target device, the command information to be supplied to the control target device after the control target device outputs the information indicating the state.

With the configuration described above, the information processing device estimates the command information using the first trained model that is trained using training data including the information including the operation speed and defining the operation of the control target device. With this configuration, the operation of the control target device, the operation speed of which is variable, can be stably predicted.

With an information processing device according to a tenth aspect of the present invention, in the ninth aspect, the information including the operation speed may include information indicating a frequency representing an operation periodicity or an operation execution time of the control target device.

With the configuration described above, the information processing device estimates the command information using the first trained model that is trained using training data including the frequency indicating the operation periodicity of the control target device. With this configuration, the operation of the control target device that performs periodic operations can be stably predicted.

With an information processing device according to an eleventh aspect of the present invention, in the ninth or the tenth aspect, the first trained model may be a trained model that derives, from the input data, the command information to be supplied to the control target device after the control target device outputs the information indicating the state and a predetermined unit of time elapses.

With the configuration described above, the information processing device estimates the command information using the first trained model that derives the command information supplied to the control target device when the unit of time elapses after the control target device has output the information indicating the state. With this configuration, the operation of the control target device, the operation speed of which is variable, can be stably predicted.

With an information processing device according to a twelfth aspect of the present invention, in the sixth or the seventh aspect, the first trained model may be a trained model that derives as output data, from input data including the information indicating the state and information, including an operation speed, for defining an operation to be instructed to the control target device, the command information to be supplied to the control target device after the control target device outputs the information indicating the state, and the first generation unit may generate the first trained model by using the command information, the information indicating the state, and information including the operation speed that are collected as a result of operation of the control target device while the operation speed of the control target device is changed.

With the configuration described above, the first trained model is generated using training data collected by operating the control target device while changing the operation speed of the control target device. With the information processing device controlling the operation of the control target device using this trained model, the operation of the control target device the operation speed of which is variable can be stably predicted.

With an information processing device according to a thirteenth aspect of the present invention, in the first to the twelfth aspects, the first trained model may be a trained model trained using, as input information, information indicating a second state derived by a third trained model that derives, from the command information, the information indicating the second state, the second state being output from the control target device after the command information is supplied to the control target device.

With the configuration described above, the first trained model is generated with the information indicating the state derived by the third trained model used for the input information to train the first trained model. The information processing device controls the operation of the control target device using the first trained model, and thus can stably predict the operation of the control target device.

A method according to a fourteenth aspect of the present invention is a method executed by an information processing device, and includes: estimating command information per first unit of time, by using a first trained model that derives the command information to be supplied to a control target device from information indicating a state of the control target device, the information being output from the control target device that operates in accordance with the command information; estimating the command information per second unit of time shorter than the first unit of time, by using a second trained model that derives the command information to be supplied to the control target device from information indicating a relationship between the information indicating the state output from the control target device and the command information derived as a result of input of the information indicating the state to the first trained model; and operating the control target device by using the command information estimated in estimating the command information per second unit of time. The number of steps, which is three in the above description, may be n, where n is a limited integer.

With the configuration described above, the information processing device operates the control target device using the first trained model that derives the command information from the information indicating the state, and the second trained model that derives the command information from the information corresponding to the output of the first trained model. By hierarchically using this plurality of trained models in the operation control of the control target device, the operation of the control target device can be stably predicted without requiring a large amount of training data.

With an information processing device according to a fifteenth aspect of the present invention, in the first to the fifth aspects, the second estimation unit may use two or more (n) of the second trained models to estimate the command information, where n is a natural number equal to or greater than two, and the two or more (n) of the second trained models may be hierarchically used, and information indicating a relationship corresponding to the command information derived from the second trained model in each layer corresponds to input information for the second trained model in a lower layer than the second trained model.

With the configuration described above, with the plurality of trained models hierarchically used, the operation of the control target device can be predicted stably.

With an information processing device according to a sixteenth aspect of the present invention, in the first to the fifth aspects, the control target device may be a device that performs work on a target object, and the information processing device may further include a change control unit configured to change one or both of the first unit of time and the second unit of time depending on a degree of hardness/softness of the target object.

With the configuration described above, the estimation period can be changed in accordance with the degree of hardness/softness of the target object. Thus, the operation of the control target device can be stably predicted.

With an information processing device according to a seventeenth aspect of the present invention, in the first to the twelfth aspects, the first trained model may be a trained model that derives, from the information indicating the state, information indicating a second state of the control target device after a predetermined period of time elapses and the command information, and is trained using, as input information, the information indicating the second state derived by the first trained model.

With the configuration described above, the first trained model is generated with the information indicating the state derived by the first trained model used for the input information to train the first trained model. The information processing device controls the operation of the control target device using the first trained model, and thus can stably predict the operation of the control target device.

With an information processing device according to an eighteenth aspect of the present invention, in the first to the twelfth aspects, the first trained model may be a trained model that derives, from the command information and the information indicating the state, information indicating a second state of the control target device after a predetermined period of time elapses and the command information, and is trained using, as input information, the command information and the information indicating the second state that are derived by the first trained model.

With the configuration described above, the first trained model is generated with the information indicating the state derived by the first trained model used for the input information to train the first trained model. The information processing device controls the operation of the control target device using the first trained model, and thus can stably predict the operation of the control target device.

With an information processing device according to a nineteenth aspect of the present invention, in the fifteenth aspect, the two or more (n) of the second trained models may be different from each other in operating frequency.

With the configuration described above, with the plurality of trained models hierarchically used, the trained models can be each trained at the operating frequency suitable for a corresponding one of a plurality of operations performed by the control target device.

With an information processing device according to a twentieth aspect of the present invention, in the thirteenth to the eighteenth aspects, the input information may be of a value quantitatively expressed.

With the configuration described above, since the input information is a value quantitatively expressed, the information processing device can correct the command speed based on the actual operation speed. Thus, the information processing device can implement autonomous training, whereby the trained model can be trained easily.

With an information processing device according to a twenty first aspect of the present invention, in the first to the fifth aspects, the control target device may hold a holding target object or contact a contact target object, the first trained model and the second trained model may store an operation of holding the holding target object or contacting the contact target object, and the first trained model or the second trained model may be trained using the operation of holding the holding target object or contacting the contact target object depending on a degree of hardness/softness of the holding target object or the contact target object.

With the configuration described above, the trained model trained vanes depending on the hardness/softness of the target object even when the operation is the same, whereby the trained model can be trained with a more suitable sampling time. Thus, with the configuration described above, the amount of time required for the training can be reduced, and the memory capacity required for storing the trained model can be reduced.

With an information processing device according to a twenty-second aspect of the present invention, in the twenty-third aspect, the first trained model may be trained for an operation in a case where the holding target object is a soft object, the second trained model may be trained for an operation in a case where the holding target object is a hard object, and the first trained model and the second trained model may be different from each other in operating frequency.

With the configuration described above, when the target object is a soft object, the trained model is trained at a low operating frequency because the low operating frequency is suitable for such an object, and when the target object is a hard object, the trained model is trained at a high operating frequency because a high operating frequency is suitable for such an object. Thus, with the configuration described above, the trained model can be trained with a more suitable sampling time. Thus, with the configuration described above, the amount of time required for the training can be reduced, and the memory capacity required for storing the trained model can be reduced.

A program according to a twenty-third aspect of the present invention is a program for causing a computer to operate as the information processing device described in any one of the first to the thirteenth and the fifteenth to the twenty-second aspects, the program causing the computer to operate as each of the units.

With an information processing device according to a twenty-fourth aspect of the present invention, in the first to the fifth and the seventh aspects, the first estimation unit may estimate a plurality of pieces of the command information at a plurality of time points, and the second estimation unit may estimate a piece of the command information for each of the plurality of pieces of the command information estimated at each of the plurality of time points.

With the configuration described above, the trained model in an upper layer and the trained model in a lower layer can each be independently and separately trained. Furthermore, with the configuration described above, the state can be more accurately estimated with a smaller amount of training.

The scope of the present invention includes a program described in the nineteenth aspect and a computer-readable recording medium recording the program.

The information processing device according to each aspect of the present invention may be implemented by a computer. In this case, a control program of the information processing device that implements the information processing device in a computer by making the computer operate as the components (software elements) included in the information processing device, and a computer-readable recording medium storing the control program are also within the scope of the present invention.

Advantageous Effects of Invention

According to an aspect of the present invention, an operation of a control target device controlled using a trained model can be stably predicted.

DESCRIPTION OF EMBODIMENTS

First Embodiment

Embodiments of the present invention will be described below.

Figure 1:
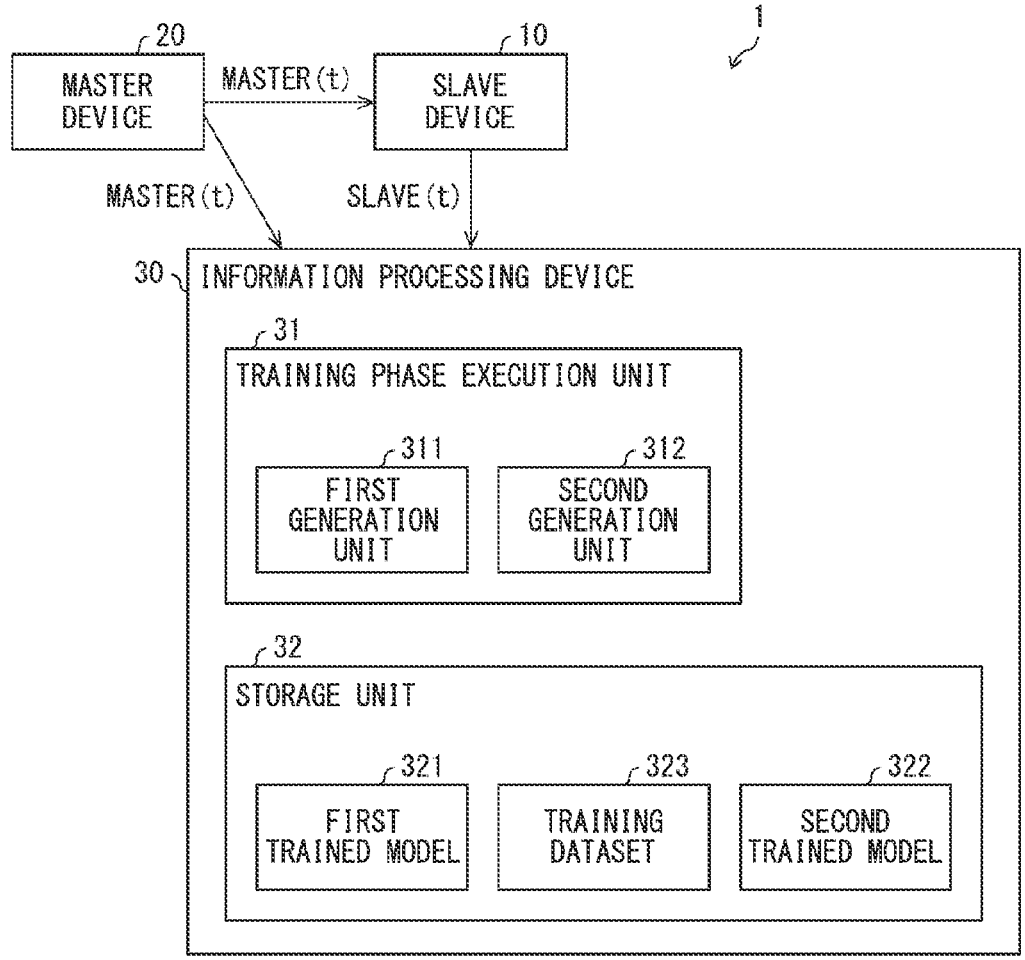
FIG. 1 is a schematic view of a configuration of a system according to a first embodiment of the present invention.

FIG. 1 is a diagram schematically illustrating an example of a configuration of a system 1 including an information processing device 30 according to a first embodiment of the present invention. The system 1 is a system that generates a trained model used for operating a control target device. The system 1 includes a slave device 10, a master device 20, and the information processing device 30.

Each of the slave device 10 and the master device 20 is, for example, a robot including a robot arm. The slave device 10 is a device that operates in accordance with command information MASTER (t) supplied at a time point t. The slave device 10 is an example of a control target device according to the present invention. At the time point t, the slave device 10 outputs state information SLAVE (t) indicating the state of the slave device 10. The state information SLAVE (t) includes, for example, information indicating an operation of the robot arm included in the slave device 10 at the time point t. The information indicating the operation of the robot arm includes, for example, information indicating a position of the robot arm, orientation such as a joint angle, angular velocity of a joint, torque, and an image indicating the relationship between the surrounding situation and the robot arm. Note that the information included in the state information SLAVE (t) is not limited to the above, and other types of information may be included.

The master device 20 is a device that operates in accordance with a user operation. The master device 20 is an example of a device that outputs command information. The master device 20 supplies the command information MASTER (t) to the slave device 10. The command information MASTER (t) is information obtained from a device that outputs the command information. In the present embodiment, the command information MASTER (t) is information indicating a state of the master device 20 that has changed in accordance with a user operation on the master device 20. The command information MASTER (t) includes, for example, information indicating an operation of a robot arm of the master device 20 at the time point t. The information indicating the operation of the robot arm includes, for example, information indicating a position of the robot arm, orientation such as an angle of a joint, angular velocity of a joint, torque, and an image indicating the relationship between the surrounding situation and the robot arm. Note that the information included in the command information MASTER (t) is not limited to the above, and other types of information may be included.

The operations performed by the slave device 10 and the master device 20 include: almost all operations performed by a person, examples of which include an operation of writing and drawing characters or pictures using a writing material, a cleaning operation using a cleaning tool, a cooking operation, an operation of holding an object, a painting operation, a polishing operation, a cutting operation, a drilling operation, an assembling operation, or the like, and operations performed by a person and a robot in cooperation with each other, an example of which includes transportation or movement of a heavy object.

The information processing device 30 is a device that generates a trained model for operating the control target device using the command information MASTER (t) output from the master device 20 and the state information SLAVE (t) output from the slave device 10. The information processing device 30 is, for example, a server apparatus or a personal computer.

The information processing device 30 includes a training phase execution unit 31 and a storage unit 32. The training phase execution unit 31 includes a first generation unit 311 and a second generation unit 312. The storage unit 32 stores a first trained model 321, a second trained model 322, and a training dataset 323.

The first generation unit 311 generates the first trained model 321 through training, using a set of input information and output information, for the correlation between the input information and the output information. In the present embodiment, the input information input to the first trained model 321 is the state information SLAVE (t) output by the slave device 10 at the time point t. The output information is command information MASTER (t+T1) supplied to the slave device 10 at a time point (t+T1) later than the time point t by a predetermined unit of time T1. The unit of time T1 may be zero or a negative value.

The first trained model 321 may be any trained model with which the command information MASTER (t+T1) can be generated from the state information SLAVE (t). The first trained model 321 can be implemented by, for example, a convolutional neural network (CNN), a recurrent neural network (RNN), a long short-term memory (LSTM), a deep neural network (DNN), or a combination of these.

Figure 2:
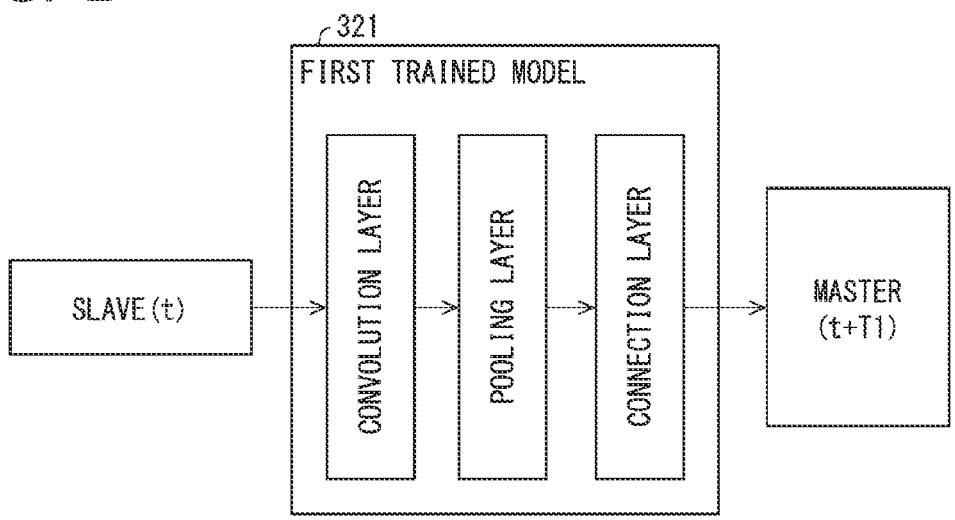
FIG. 2 is a schematic view of an example of a first trained model.

FIG. 2 is a diagram schematically illustrating an example of the first trained model 321. As described above, the state information SLAVE (t) is input to the first trained model 321 as input data. The first trained model 321 includes, for example, a convolution layer, a pooling layer, and a connection layer. In the convolution layer, the input data is subjected to filtering by which information is convolved. The data after the convolution is subjected to pooling processing in the pooling layer. This processing improves the function of the model for recognizing a change in position of a feature in the data. The data after the pooling processing is processed in the connection layer to be converted into a format of output data from the first trained model 321, that is, the command information MASTER (t+T1) supplied to the slave device 10 at the time point (t+T1). The unit of time T1 is, for example, an LSTM sampling period, and is, for example, 400 msec.

When the master device 20 and the slave device 10 include robot arms, the state information SLAVE (t) includes, for example, nine parameters of joint angles ($\theta s1(t)$, $\theta s2(t)$, $\theta s3(t)$), angular velocities ($\theta s1'(t)$, $\theta s2'(t)$, $\theta s3'(t)$) of joints, and torques ($\tau s1(t)$, $\tau s2(t)$, $\tau s3(t)$) of the robot arms at the time point t. The command information MASTER (t) also includes nine parameters of joint angles ($\theta m1(t)$, $\theta m2(t)$, $\theta m3(t)$), the angular velocities ($\theta m1'(t)$, $\theta m2'(t)$, $\theta m3'(t)$) of the joints, and torques ($\tau m1(t)$, $\tau m2(t)$, $\tau m3(t)$) of the robot arm at the time point t.

Figure 3:
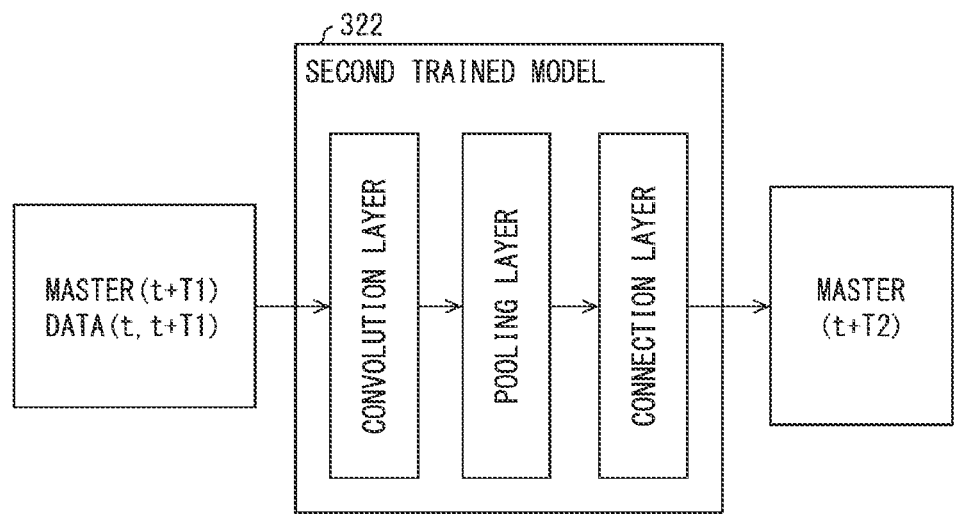
FIG. 3 is a schematic view of an example of a second trained model.

The second generation unit 312 generates the second trained model 322 through training, using a set of input information and output information, for the correlation between the input information and the output information. The input information for the second trained model 322 may be the state information SLAVE (t) output by the slave device 10 and the command information MASTER (t+T1) derived by inputting the same to the first trained model 321, or data in which these pieces of information are in low correlation with each other. For example, as illustrated in FIG. 3, information DATA (t, t+T1) may be included that indicates a relationship between the state information SLAVE (t) output by the slave device 10 and the command information MASTER (t+T1) derived by inputting the state information SLAVE (t) to the first trained model 321. The output information from the second trained model 322 is command information MASTER (t+T2) supplied to the slave device 10 when a second unit of time T2 elapses. Specifically, the output information of the second trained model 322 is the command information MASTER (t+T2) supplied to the slave device 10 when the second unit of time T2, shorter than the first unit of time T1, elapses after the state information SLAVE (t) has been output by the slave device 10 as the input information for the first trained model 321. In the present embodiment, the unit of time T2 may be shorter than the unit of time T1.

The second trained model 322 may be any trained model with which the command information MASTER (t) can be generated from the state information SLAVE (t). The second trained model 322 can be implemented by, for example, a CNN, an RNN, an LSTM, a DNN, or a combination of these. The unit of time T2 is, for example, an LSTM sampling period, and is, for example, 20 msec. The unit of time T2 may be 0.

The information DATA (t, t+T1) is information indicating a relationship between the state information SLAVE (t) and the command information MASTER (t+T1). In the present embodiment, the information DATA (t, t+T1) is data in low correlation with the command information MASTER (t+T1) output by the first trained model 321. The lowly correlated data is data in no or low correlation with the command information MASTER (t+T1). The information DATA (t, t+T1) is, for example, information derived from the state information SLAVE (t) and the command information MASTER (t+T1).

The information DATA (t, t+T1) is, for example, information indicating a difference or a ratio between the state information SLAVE (t) and the command information MASTER (t+T). The information DATA (t, t+T1) is expressed by the following Formula (1) as an example. The correlation between the input and the output to and from the second trained model 322 is reduced by using the difference or the ratio between the state information SLAVE (t) and the command information MASTER (t+T1).

$$\text{DATA}(t,t+T1)=\text{SLAVE}(t)-\text{MASTER}(t+T1) \tag{1}$$

FIG. 3 is a diagram schematically illustrating an example of the second trained model 322. In the example illustrated in FIG. 3, the input information input to the second trained model 322 includes the command information MASTER (t+T) and the information DATA (t, t+T1). Thus, in the example illustrated in FIG. 3, the command information (t+T1) and the information DATA (t, t+T1) are input to the second trained model 322 as the input data.

The second trained model 322 includes, for example, a convolution layer, a pooling layer, and a connection layer. In the convolution layer, the input data is subjected to filtering by which information is convolved. The data after the convolution is subjected to pooling processing in the pooling layer. This processing improves the function of the model for recognizing a change in position of a feature in the data. The data after the pooling processing is processed in the connection layer to be converted into a format of output data from the second trained model 322, that is, the command information MASTER (t+T2) supplied to the slave device 10 at the time point (t+T2).

Figure 4:
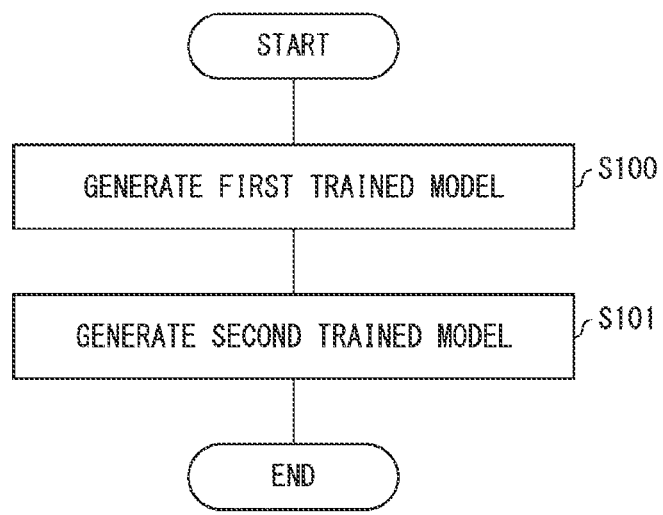
FIG. 4 is a flowchart illustrating an example of a flow of processing executed by the information processing device.

FIG. 4 is a flowchart illustrating a flow of processing of generating a trained model executed by the information processing device 30. Note that some of the steps may be executed in parallel or in a different order. In Step S100, the first generation unit 311 generates the first trained model 321 using training data included in the training dataset 323. As described above, the training data used for training the first trained model 321 is a set of the state information SLAVE (t) and the command information (t+T1).

In Step S101, the second generation unit 312 generates the second trained model 322 using training data included in the training dataset 323. As described above, the training data used for training the second trained model 322 is a set of the command information (t+T1) and the information DATA (t, t+T1), and the command information (t+T2).

With the first trained model 321 and the second trained model 322 generated in the present embodiment hierarchically used, the control target device is operated. More specifically, the information corresponding to the output of the first trained model 321 is used as the input information for the second trained model 322, and the command information (t+T2) which is the output of the second trained model 322 is used for controlling the operation of the control target device. The operation control for the control target device will be described below in a second embodiment.

Next, a specific example of the configuration of the present embodiment will be described with reference to the drawings.

EXAMPLES

Figure 5:
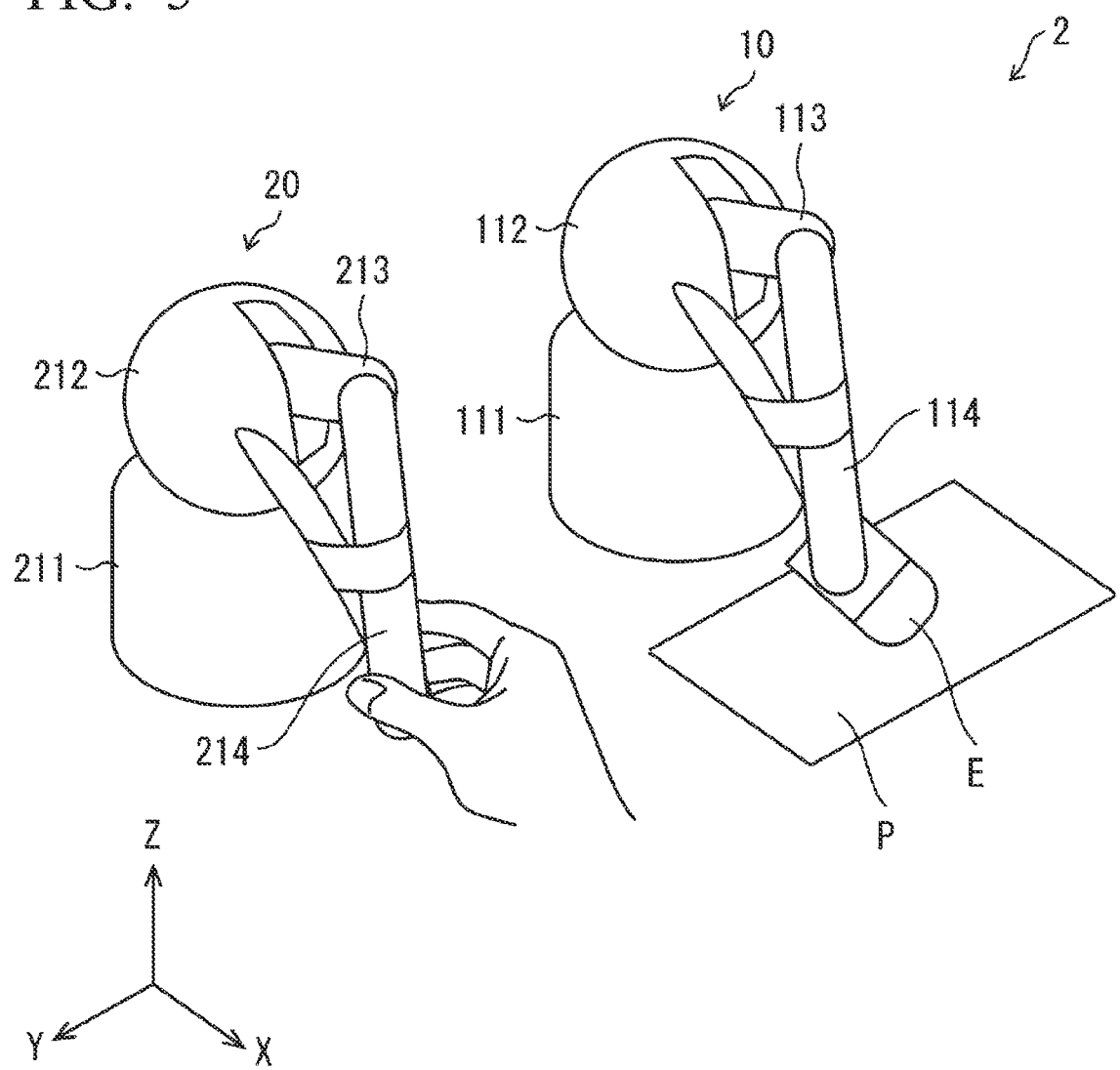
FIG. 5 is a schematic view of a system for collecting training data.

FIG. 5 is a schematic view of a system for collecting the training data according to the present embodiment. In FIG. 5, this system 2 is a master-slave system that includes the master device 20 and the slave device 10 that operates in accordance with the operation of the master device 20. The command information MASTER (t) and the state information SLAVE (t) collected in the system 2 are used as training data for training the first trained model 321 and the second trained model 322.

The system 2 is a system for collecting the command information MASTER (t) and state information SLAVE (t) for an operation of erasing a line using an eraser. The master device 20 includes a base part 211, a rotating part 212 placed on the base part 211, a first arm part 213 connected to the rotating part 212, and a second arm part 214 connected to the first arm part 213. The rotating part 212 is rotatable about the Z axis with respect to the base part 211. The first arm part 213 has a first end portion connected to the rotating part 212 and is swingable about the Y axis with the first end portion serving as the fulcrum. As a result, a second end portion of the first arm part 213 is swingable in a Z axis direction. The second arm part 214 has a first end portion connected to the first arm part 213 and is swingable about the Y axis with the first end portion serving as the fulcrum. As a result, a second end portion of the second arm part 214 is swingable in an X-axis direction. With this configuration, an operator can hold the second end portion of the second arm part 214, and perform a moving operation in the X, Y, Z axis directions.

The slave device 10 operates in response to the command information MASTER (t) output from the master device 20. The slave device 10 includes a base part 111, a rotating part 112 placed on the base part 111, a first arm part 113 connected to the rotating part 112, and a second arm part 114 connected to the first arm part 113. The rotating part 112 is rotatable about the Z axis with respect to the base part 111. The first arm part 113 has a first end portion connected to the rotating part 112 and is swingable about the Y axis with the first end portion serving as the fulcrum. As a result, a second end portion of the first arm part 113 is swingable in a Z axis direction. The second arm part 114 has a first end portion connected to the first arm part 113 and is swingable about the Y axis with the first end portion serving as the fulcrum. As a result, a second end portion of the second arm part 114 is swingable in an X-axis direction. An eraser E is attached to the second end portion of the second arm part 114. The eraser E moves in response to the moving operation performed by the operator on the second end portion of the second arm part 214.

The slave device 10 performs control to change the state of the slave device 10 to eliminate the difference between the state (for example, the joint angle, angular velocity, and the torque of the robot arm) indicated by the command information MASTER (t) supplied from the master device 20 and the state of the slave device 10.

A paper surface P on which a line is drawn is placed under the second arm part 114, and the height of the paper surface P in the Z axis direction is adjustable. For example, in a state where the height of the paper surface P is adjusted to 20 mm, the operator first holds the second end portion of the second arm part 214 and performs a moving operation of lowering the second end portion in the Z axis direction. When the eraser E attached to the second end portion of the second arm part 114 comes into contact with the paper surface P, the operator operates and moves the second end portion of the second arm part 214 in the X axis and the Y axis directions while the eraser E is in contact with the paper surface P. Thus, the operator performs an operation of erasing the line drawn on the paper surface P with the eraser E.

The information processing device 30 collects the command information MASTER (t) and the state information SLAVE (t) in time series in the above-described series of operations and stores the collected information in the storage unit 32. The information processing device 30 executes the processing of generating the first trained model 321 and the second trained model 322 described above using the command information MASTER (t) and the state information SLAVE (t) thus collected.

The line-erasing operation using the eraser E as described above may be similarly performed in each of states where the height of the paper surface P is adjusted to 50 mm and 80 mm.

Modified Example

In the above embodiment, a description has been given of the configuration in which the master device 20 supplies the command information MASTER (t) to the slave device 10. The device that supplies the command information MASTER (t) to the slave device 10 is not limited to the master device 20 and may be other devices.

In the above embodiment, a description has been given of a case in which trained models in two layers including an upper layer trained model (the first trained model 321) and a lower layer trained model (the second trained model 322) are generated. The number of layers of the trained model are not limited to two and may be three or more. Also, in a case where there are three or more layers, information corresponding to an output from the trained model in the upper layer is used as the input for the trained model in the lower layer, as in the above-described embodiment.

Specifically, a second estimation unit 332 estimates the command information using n second trained models 322 (n is a natural number of 2 or more) that are hierarchically used, and information DATA corresponding to command information MASTER derived by each of the second trained models 322 in each layer serves as the input information for the second trained model 322 in a layer lower than the second trained model 322.

In this case, the sampling period (estimation period) of the trained model in the upper layer is longer than the sampling period (estimation period) of the trained model in the lower layer.

For example, trained models in three layers including the first trained model 321 and two second trained models 322a and 322b may be used. In this case, the state information SLAVE (t) is input to the first trained model 321, and the command information MASTER (t+T1) is output from the first trained model 321. The command information MASTER (t+T1) and the information DATA (t, t+T1) are output from the first trained model 321 and are input to the second trained model 322a. The output from the second trained model 322a is command information MASTER (t+T2a).

The command information MASTER (t+T2a) and information DATA (t, t+T2a) are output from the second trained model 322a and are input to the second trained model 322a in the lower layer of the second trained model 322b. The output from the second trained model 322b is command information MASTER (t+T2b). The command information MASTER (t+T2b) output from the second trained model 322b in the lowermost layer is used for controlling the operation of the slave device 10.

In the above embodiment, the system 1 including one slave device 10 and one master device 20 is described as an example. However, the number of slave devices 10 and the number of master devices 20 included in the system 1 may be two or more. In this case, the information processing device 30 collects the state information SLAVE (t) and the command information MASTER (t) from a plurality of the slave devices 10 and a plurality of the master devices 20, and generates a trained model using the collected information as training data.

While a configuration in which the slave device 10 and the information processing device 30 are separate devices has been described in the above embodiment, the slave device 10 and the information processing device 30 may be configured as an integrated device.

Second Embodiment

Another embodiment of the present invention will be described below. Note that, for convenience of explanation, components having a function identical to those in the above-described embodiment will be denoted by the same reference signs, and descriptions of those components will be omitted.

Figure 6:
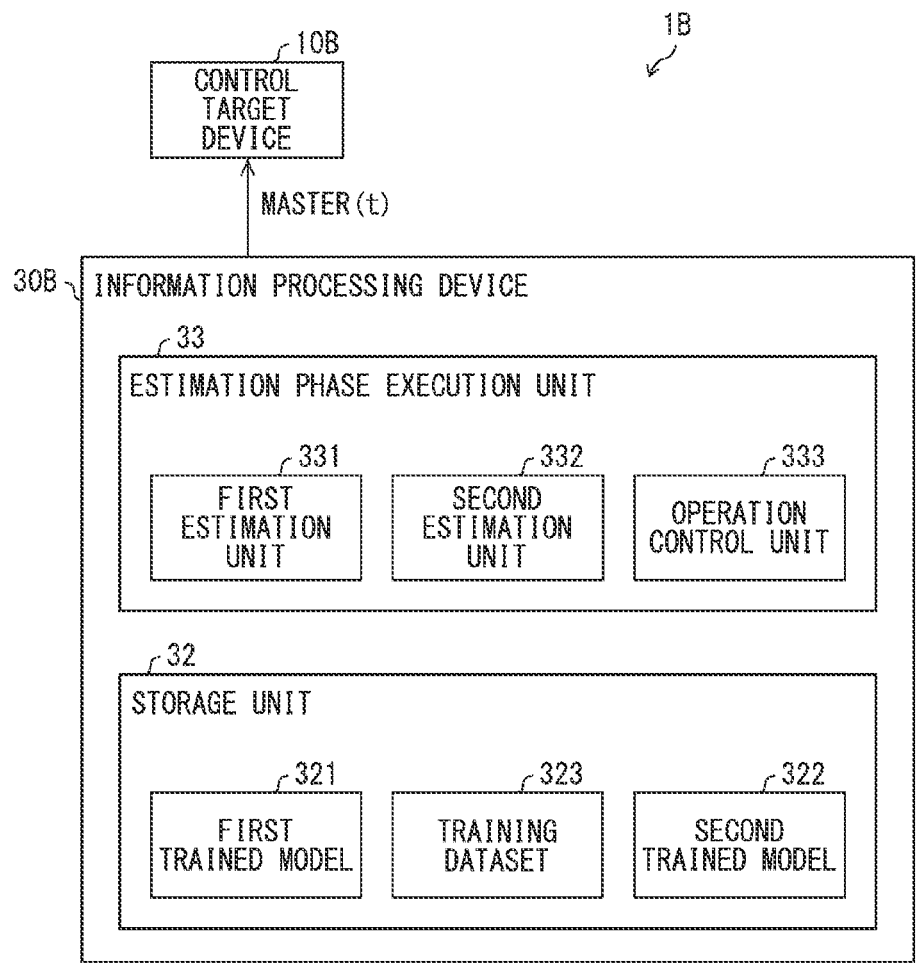
FIG. 6 is a schematic view of a configuration of a system according to a second embodiment of the present invention.

FIG. 6 is a diagram schematically illustrating an example of a configuration of a system 1B including an information processing device 30B according to a second embodiment of the present invention. The system 1B is a system of operating a control target device 10B using trained models in a plurality of layers trained. The system 1B includes the control target device 10B and the information processing device 30B. The control target device 10B is a device that operates in accordance with the command information MASTER (t). The control target device 10B is, for example, a device including a robot arm, and is, for example, the slave device 10 according to the first embodiment. The information processing device 30B operates the control target device 10B by supplying the command information MASTER (t) to the control target device 10B.

The information processing device 30B includes an estimation phase execution unit 33 and the storage unit 32. The estimation phase execution unit 33 includes a first estimation unit 331, a second estimation unit 332, and an operation control unit 333. The first estimation unit 331 estimates the command information MASTER (t+T1) from the state information SLAVE (t), per first unit of time τ1 by using the first trained model 321. The second estimation unit 332 estimates the command information MASTER (t+T2) from the input data including the information DATA (t, t+T1) per second unit of time τ2 by using the second trained model 322. The operation control unit 333 operates the control target device 10B by using the command information MASTER (t+T2) estimated by the second estimation unit 332. The second unit of time τ2 is shorter than the first unit of time τ1. The first unit of time τ1 is, for example, 400 ms. The second unit of time τ2 is, for example, 20 ms.

Figure 7:
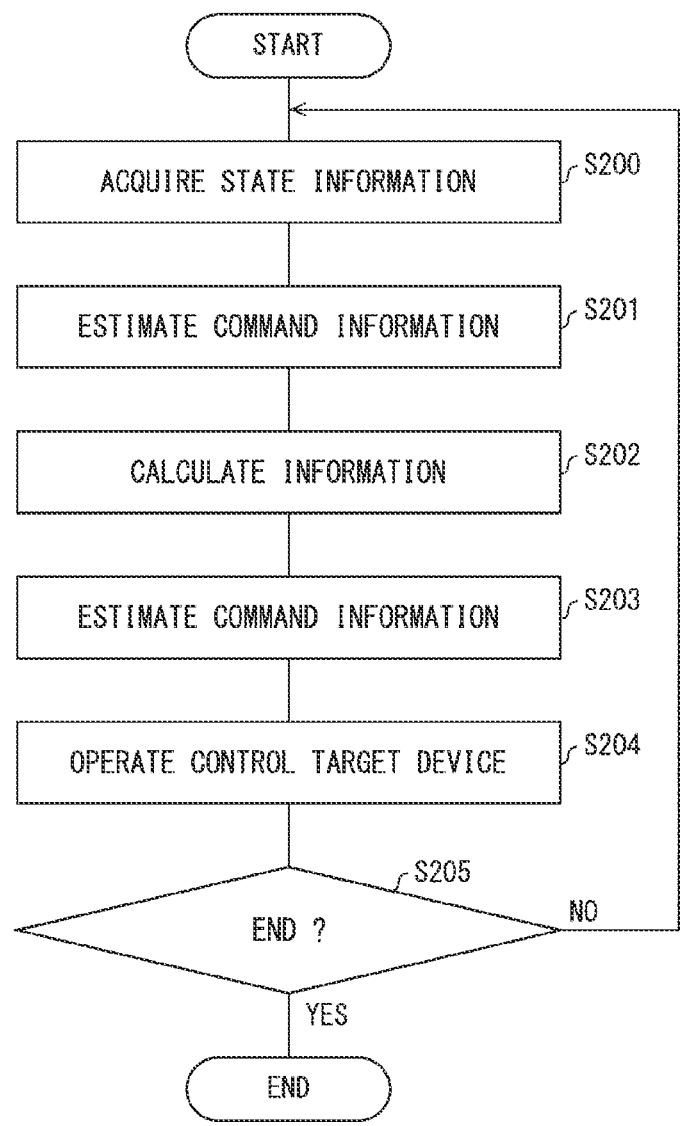
FIG. 7 is a flowchart illustrating an example of a flow of processing executed by the information processing device.

FIG. 7 is a flowchart illustrating a flow of operation control processing for the control target device 10B executed by the information processing device 30B. Note that some of the steps may be executed in parallel or in a different order.

In step S200, the first estimation unit 331 acquires the state information SLAVE (t) from the control target device 10B. In step S201 (an example of a first step), the first estimation unit 331 estimates the command information MASTER (t+T1) per unit of time τ1 using the acquired state information SLAVE (t) and the first trained model 321. Specifically, the first estimation unit 331 estimates the command information MASTER (t+T1) derived by inputting the state information SLAVE (t) to the first trained model 321.

In step S202, the first estimation unit 331 calculates the input information for the second trained model 322 using the state information SLAVE (t) input to the first trained model 321 and the command information MASTER (t+T1) estimated in step S200. For example, the input information is a set of the command information MASTER (t+T1) and the information DATA (t, t+T1). The information DATA (t, t+T1) is calculated using, for example, Formula (1) described above.

In step S203 (an example of a second step), the second estimation unit 332 estimates command information MASTER (t, t+T2) once in each unit of time τ2 from the information DATA (t, t+T1) indicating a relationship between the state information SLAVE (t) and the command information MASTER (t+T1) using the second trained model 322. More specifically, for example, the second estimation unit 332 estimates the command information MASTER (t+T2) derived by inputting the command information MASTER (t+T1) and the information DATA (t, t+T1) to the second trained model 322 as the input data. In the present embodiment, since the unit of time τ2 is shorter than the unit of time τ1, the input data is input to the second trained model 322 more frequently than the output of the command information MASTER (t+T1) from the first trained model 321. Therefore, one command information MASTER (t+T1) output from the first trained model 321 may be input to the second trained model 322 more than once.

That is, in the present embodiment, a plurality of trained models (the first trained model 321 and the second trained model 322) are hierarchized, and information corresponding to an output from a trained model in a higher layer is input to a trained model in a lower layer.

Figure 8:
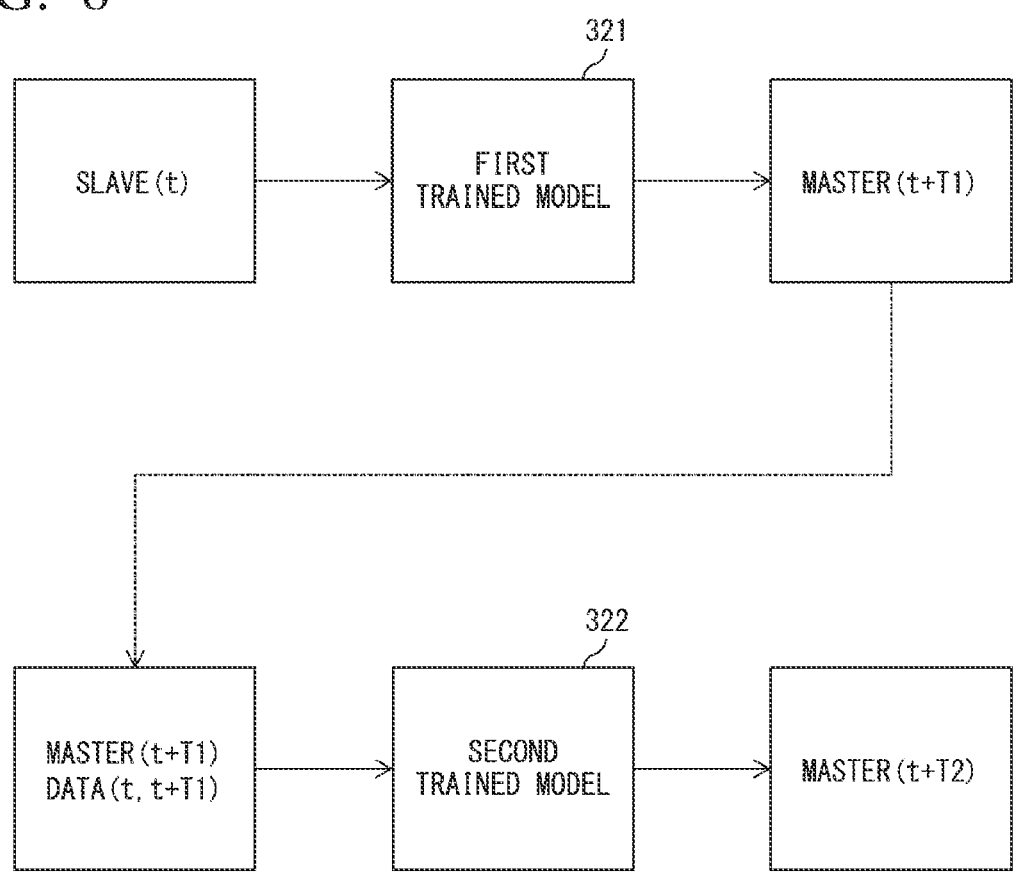
FIG. 8 is a schematic view of hierarchized trained models.

FIG. 8 is a diagram schematically illustrating hierarchized trained models. In the example illustrated in FIG. 8, the first trained model 321 and the second trained model 322 are hierarchically used. The first trained model 321 is an upper-layer trained model and is, for example, an LSTM with a sampling period of 400 msec. The second trained model 322 is a lower-layer trained model and is, for example, an LSTM with a sampling period of 20 msec. Thus, in the present embodiment, the sampling period of the upper-layer trained model is longer than the sampling period of the lower-layer trained model.

In the example illustrated in FIG. 8, the information DATA (t, t+T1) corresponding to the output command information MASTER (t+T1) of the first trained model 321, which is in the upper layer is input to the second trained model 322, which is in the lower layer.

In FIG. 8, the state information SLAVE (t) that is the input information for the first trained model 321 includes, for example, nine parameters of joint angles ($\theta s1(t)$, $\theta s2(t)$, $\theta s3(t)$), angular velocities ($\theta s1'(t)$, $\theta s2'(t)$, $\theta s3'(t)$) of joints, and torques ($\tau s1(t)$, $\tau s2(t)$, $\tau s3(t)$) of the robot arms at the time point t. The command information MASTER (t+T1) that is the output information from the first trained model 321 includes, for example, nine parameters of the joint angles ($\theta m1$ (t+T1), $\theta m2$ (t+T1), $\theta m3$ (t+T1)), the angular velocities of the joints ($\theta m1'$ (t+T1), $\theta m2'$ (t+T1), $\theta m3'$ (t+T1)), and the torques ($\tau m1$ (t+T1), $\tau m2$ (t+T1), $\tau m3$ (t+T1)) of the robot arm at the time point t.

On the other hand, in FIG. 8, the input information for the second trained model 322 includes, for example, a total of 18 parameters including the nine parameters of the command information MASTER (t+T1) and the nine parameters of the information DATA (t, t+T1) including nine parameters, that is, a total of 18 parameters.

A description is further given by referring back to FIG. 7. In step S204 (an example of a third step), the operation control unit 333 operates the control target device 10B at the time point (t+T2) using the command information MASTER (t+T2) estimated in step S202. As described above, the command information MASTER (t+T2) includes, for example, joint angle, joint angular velocity, and torque of the robot arm at the time point (t+T2). The control target device 10B operates the robot arm in accordance with the command information MASTER (t+T2) supplied from the information processing device 30B at the time point (t+T2). The control target device 10B performs control to change the state of the control target device 10B to eliminate the difference between the state (for example, the joint angle, angular velocity, and the torque of the robot arm) indicated by the command information MASTER (t) supplied from the information processing device 30B and the state of the control target device 10B.

In step S205, the operation control unit 333 determines whether or not to end the operation control. This determination may be made, for example, by determining whether the operator has performed an operation to end the operation control. When the operation control is to be ended (step S205; YES), the operation control unit 333 ends the processing. On the other hand, when the operation control is not to be ended (step S205; NO), the operation control unit 333 returns to the processing in step S200 and continues the estimation processing for the command information MASTER (t+T2) using the state information SLAVE (t) and the operation control processing for the control target device 10B.

When the command information MASTER (t) to be supplied to the control target device 10B is to be estimated by one trained model, it is necessary to deepen the hierarchy of the trained model for stabilization of the operation prediction. This requires an enormous amount of training data and calculation time.

On the other hand, in the present embodiment, the information processing device 30B operates the control target device 10B by using the first trained model 321 that derives the command information MASTER (t+T1) from the state information SLAVE (t) and the second trained model 322 that derives the command information (t+T2) from the information corresponding to the output from the first trained model. Thus, in the present embodiment, a plurality of trained models is hierarchized, and an output from an upper-layer trained model (the first trained model 321) is used as an input for a lower-layer trained model (the second trained model 322). By hierarchically using this plurality of trained models in the operation control for the control target device 10B, the operation of the control target device 10B can be stably predicted without requiring a large amount of training data.

When the state of the robot is detected using a plurality of sensors with different sensing periods, detection values from the plurality of sensors may be difficult to merge into an input for one trained model. On the other hand, according to the present embodiment, since the trained models are hierarchized, the trained model in each layer may be independently designed. Therefore, even when a plurality of sensors with different sensing periods are used, a trained model corresponding to each sensor can be individually designed, and thus can be easily generated Modified Example In the above embodiment, a description has been given of the case where the control target device 10B which is a control target is the slave device 10. Alternatively, the control target device 10B may be another device different from the slave device 10.

While a configuration in which the control target device 10B and the information processing device 30B are separate devices has been described in the above embodiment, the control target device 10B and the information processing device 30B may be configured as an integrated device.

Third Embodiment

Another embodiment of the present invention will be described below. Note that, for convenience of explanation, components having a function identical to those in the above-described embodiment will be denoted by the same reference signs, and descriptions of those components will be omitted.

Figure 9:
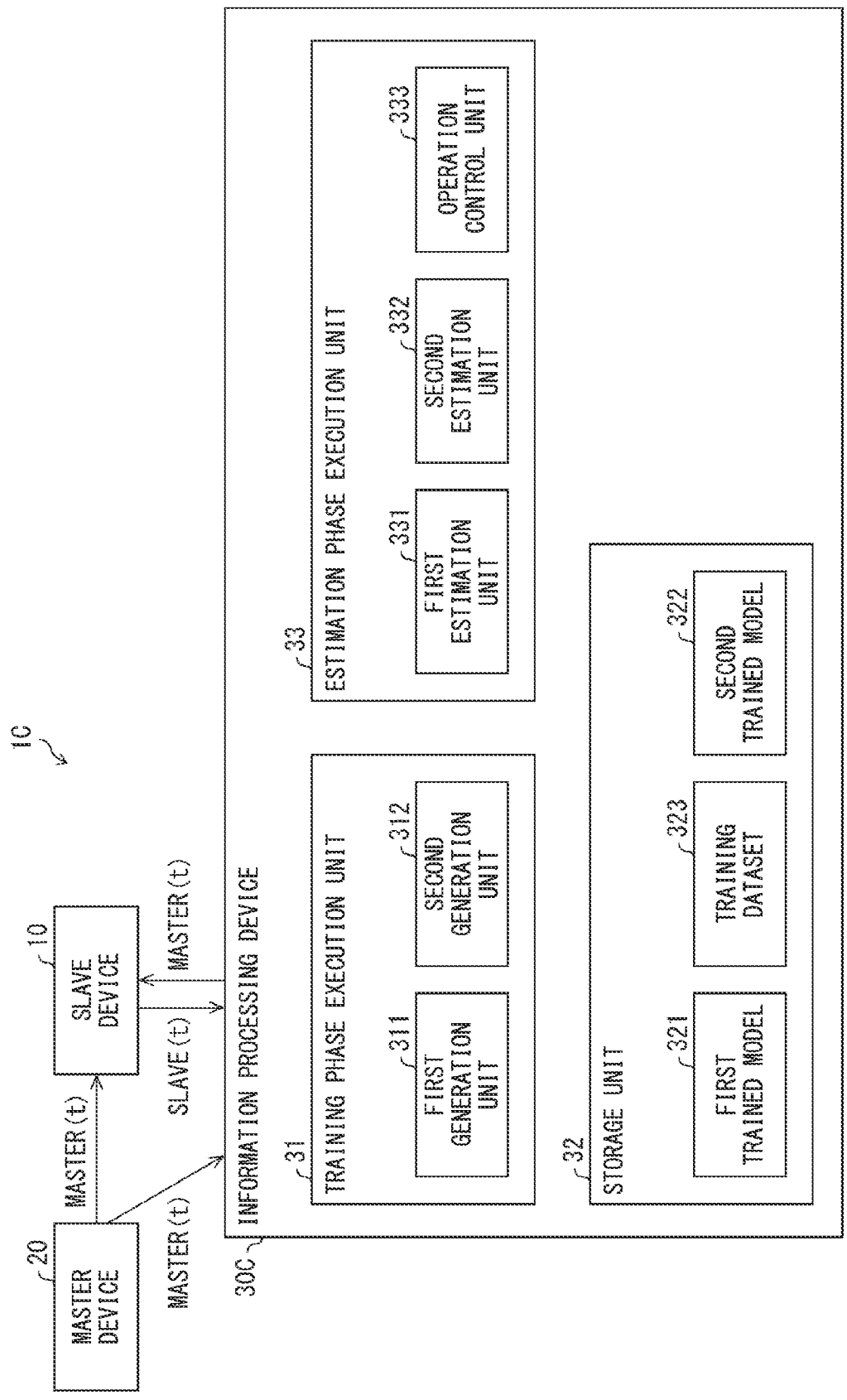
FIG. 9 is a schematic view of a configuration of a system according to a third embodiment of the present invention.

FIG. 9 is a diagram schematically illustrating an example of a configuration of a system 1C including an information processing device 30C according to a third embodiment of the present invention. The system 1C includes the slave device 10, the master device 20, and the information processing device 30C. The information processing device 30C generates a trained model for operating the slave device 10 and operates the slave device 10 by using the trained model trained.

The information processing device 30C includes the training phase execution unit 31, the storage unit 32, and the estimation phase execution unit 33. These components have been described in the first embodiment or the second embodiment above, and thus description thereof will be omitted.

In the present embodiment, the information processing device 30C generates the first trained model 321 that derives the command information MASTER (t+T1) from the state information SLAVE (t) and the second trained model 322 that derives the command information (t+T2) from the information DATA (t, t+T1) corresponding to the output from the first trained model, and operates the slave device 10 using the first trained model 321 and the second trained model 322. Thus, in the present embodiment, a plurality of trained models is hierarchized, and an output from an upper-layer trained model (the first trained model 321) is used as an input for a lower-layer trained model (the second trained model 322). By hierarchically using this plurality of trained models in the operation control of the slave device 10, the operation of the slave device 10 can be stably predicted without requiring a large amount of training data.

Fourth Embodiment

Another embodiment of the present invention will be described below. Note that, for convenience of explanation, components having a function identical to those in the above-described embodiment will be denoted by the same reference signs, and descriptions of those components will be omitted.

Figure 10:
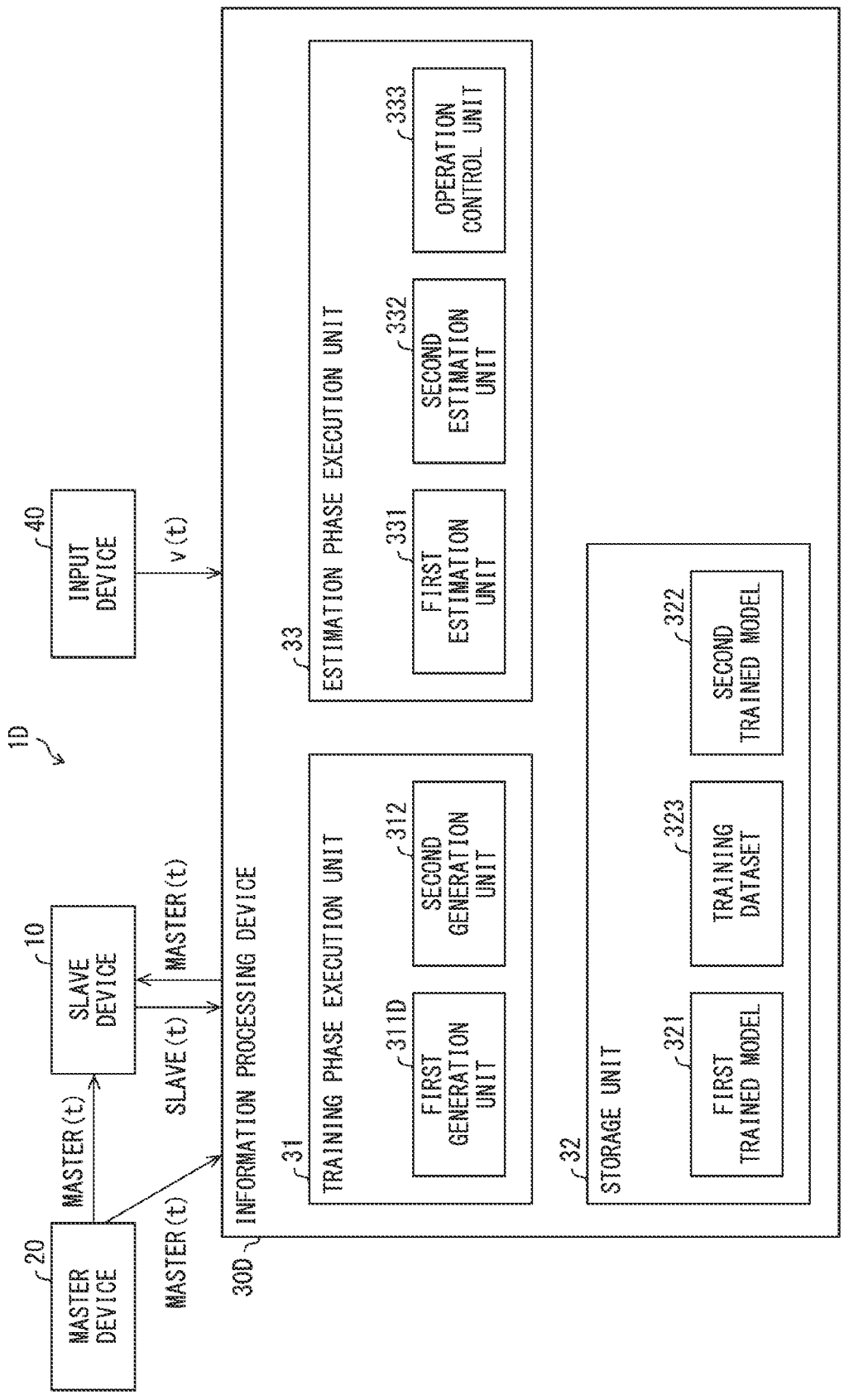
FIG. 10 is a schematic view of a configuration of a system according to a fourth embodiment of the present invention.

FIG. 10 is a diagram schematically illustrating an example of a configuration of a system 1D including an information processing device 30D according to a fourth embodiment of the present invention. The system 1D includes the slave device 10, the master device 20, the information processing device 30D, and an input device 40. The information processing device 30D implements a training phase for generating a trained model for operating the slave device 10, and an estimation phase for operating the slave device 10 by using the trained model trained.

The input device 40 inputs information including an operation speed (hereinafter referred to as "speed information") that defines the operation of the slave device 10 in the training phase to the information processing device 30D. In the present embodiment, the operation speed of the slave device 10 is variable. The input device 40 is, for example, a keyboard, a mouse, or a touch panel operated by the operator. The input device 40 may also be a device that transmits the speed information to the information processing device 30D over a communication network such as the Internet.

In the present embodiment, the input data input to a first trained model 321D includes speed information v(t) at the time point t in addition to the state information SLAVE (t) at the time point t. Thus, the first trained model 321D is a trained model that derives the command information (t+T1) from the input data including the state information SLAVE (t) and the speed information v(t).

For example, when the operation of the slave device 10 is a periodic operation, the speed information v(t) may be a frequency indicating the operation periodicity of the slave device 10. The periodic operation is, for example, an operation performed by the robot arm of the slave device 10 to repeatedly draw a line using a writing material or perform a periodic cleaning operation performed using a cleaning tool. Note that the speed information v(t) is not limited to the frequency of the operation periodicity and may be other information. The speed information may be, for example, an execution time of one operation which is information highly correlated with a frequency, a target value of the slave device 10, an operation target, information on conversation with a human, or the like.

In a training data collection phase, the operator of the master device 20 operates the master device 20 while changing the operation speed of the master device 20. Accordingly, the slave device 10 operates while changing the operation speed thereof in accordance with the command information MASTER (t) supplied from the master device 20. Thus, in this operation example, the command information MASTER (t), the state information SLAVE (t), and the speed information v(t) are collected with the slave device 10 operated while changing the operation speed of the slave device 10.

In the training phase, a first generation unit 311D generates the first trained model 321D using the command information MASTER (t), the state information SLAVE (t), and the speed information v(t) thus collected. The training data used to generate the first trained model 321D is a set of the state information SLAVE (t), the speed information v(t), and the command information MASTER (t+T1).

In the estimation phase, the first estimation unit 331 estimates the command information MASTER (t+T1) derived by inputting the state information SLAVE (t) and the speed information v(t) to the first trained model 321D as the input data. As in the third embodiment described above, the second estimation unit 332 estimates the command information (t+T2) derived by inputting the command information MASTER (t+T1) and the information DATA (t, t+T1) corresponding to the command information MASTER (t+T1) to the second trained model 322 as the input data. The operation control unit 333 operates the slave device 10 by supplying the estimated command information (t+T2) to the slave device 10 at the time point (t+T2).

To vary the operation speed of the slave device 10 from the operation speed of the slave device 10 at the time of collecting the training data, the training data used may be shortened or extended in a time axis direction. However, when the training data is compressed or extended in the time axis direction, the operation of the slave device 10 differs from the operation at the time of collecting the training data, rendering the operation difficult to reproduce. This is because inertial force or friction impacts the operation of the robot arm of the slave device 10 or the like.

Figure 11:
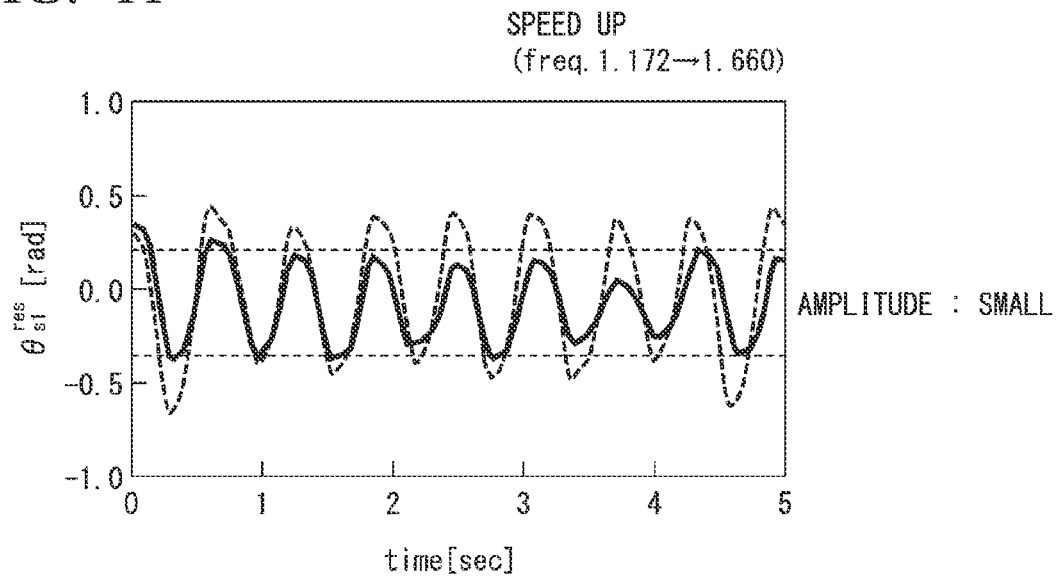
FIG. 11 is a graph illustrating a change in state value of a robot arm controlled by a known method over time.
Figure 12:
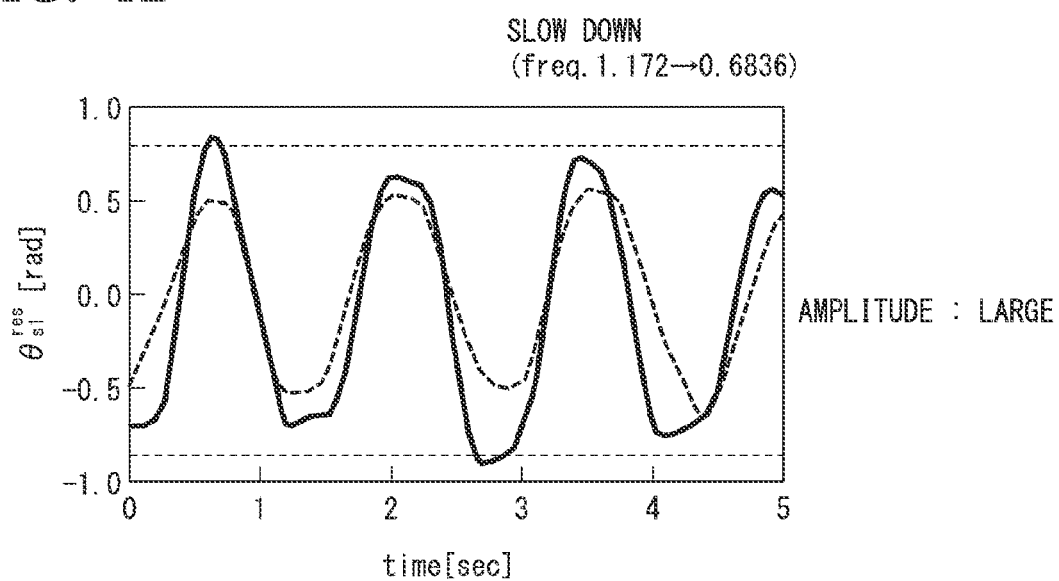
FIG. 12 is a graph illustrating a change in state value of a robot arm controlled by a known method over time.

FIG. 11 and FIG. 12 are graphs illustrating an example of how a state value of a robot arm controlled by a known method changes over time. FIG. 11 is a diagram illustrating an example of a graph indicating training data and an actual state value (the state information SLAVE (t) output from the slave device 10) in a case where the slave device 10 is operated by compressing the training data in the time axis direction in a known information processing device. FIG. 12 is a diagram illustrating an example of a graph indicating training data and an actual state value (the state information SLAVE (t) output from the slave device 10) in a case where the slave device 10 is operated by extending the training data in the time axis direction in a known information processing device.

In FIG. 11 and FIG. 12, the horizontal axis represents a time point, and the vertical axis represents an angle of the robot arm in a predetermined axis direction. A broken line indicates a response of the training data, and a solid line indicates a response at the time of execution. In the example illustrated in FIG. 11, it can be seen that an increase in the operation speed of the slave device 10 from the operation speed at the time of collecting the training data results in a smaller amplitude in the periodic operation of the slave device 10. In the example illustrated in FIG. 12, it can be seen that a decrease in the operation speed of the slave device 10 from the operation speed at the time of collecting the training data results in a larger amplitude in the periodic operation of the slave device 10.

Figure 13:
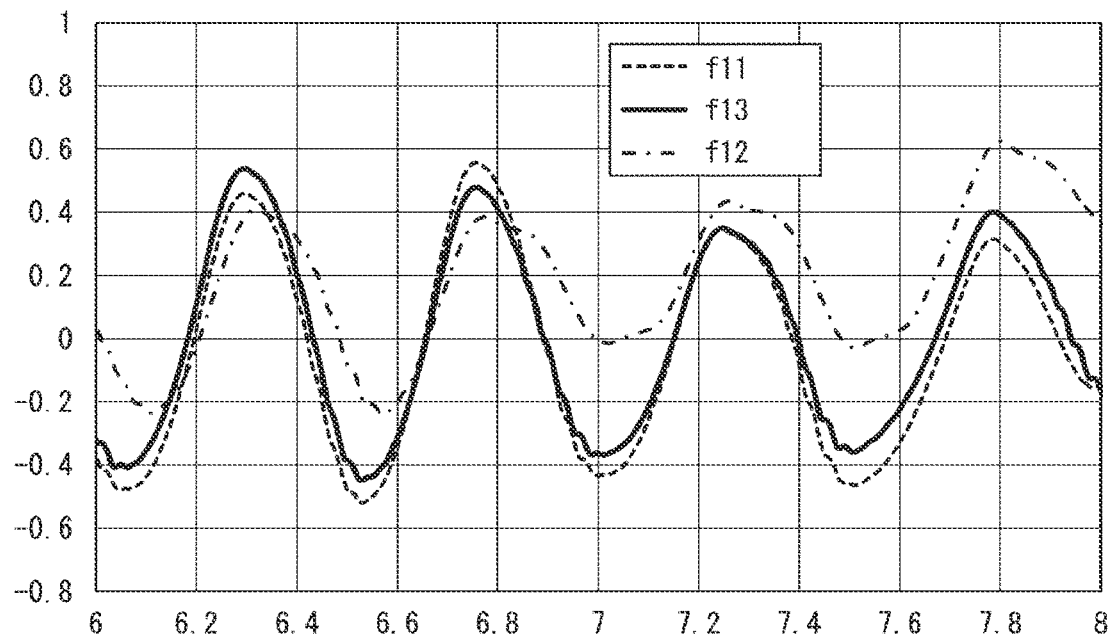
FIG. 13 is a graph illustrating a change in state value of a robot arm over time.

FIG. 13 is a diagram illustrating how the state value of the robot arm changes over time when the slave device 10 is operated by the information processing device 30D according to the present embodiment. In the figure, the horizontal axis represents a time point, and the vertical axis represents a joint angle of the robot arm of the slave device 10 in a predetermined axis direction. In the figure, a graph f11 is a graph illustrating a relationship between time and angular velocity indicated by the training data stored in the storage unit 32. A graph f12 is a graph illustrating the actual state (the angle of the robot arm) of the slave device 10 when the training data is supplied to the slave device 10. A difference (error) from the graph f11 illustrating the original training data can be clearly seen in a graph f13 illustrating a predicted operation of the master device 20 and the graph f12 illustrating a predicting operation of the slave device 10.

The graph f13 is a graph illustrating how the state value changes over time when the slave device 10 is operated by the information processing device 30D according to the present embodiment. The amplitude of the waveform in the graph f12 is smaller than the amplitude of the waveform in the graph f11, whereas the amplitude of the waveform in the graph f13 is substantially the same as the amplitude of the waveform in the graph f11. The information processing device 30D of the present embodiment can reduce the difference between the operation of the slave device 10 indicated by the training data and the actual operation. Thus, according to the present embodiment, the operation of the slave device 10 indicated by the training data can be reproduced at different operation speeds.

As described above, according to the present embodiment, the information processing device 30D estimates the command information MASTER (t+T1) by using the first trained model 321D trained using the training data including the speed information v(t) indicating the operation speed of the slave device 10. With this configuration, the operation of the slave device 10, the operation speed of which is variable, can be stably predicted.

Modified Example

In the fourth embodiment above, a description has been given of the case where the speed information on the slave device 10 is input to the information processing device 30D using the input device 40. The speed information may be information derived by the slave device 10 by measuring the operation speed thereof. In this case, the slave device 10 outputs the state information SLAVE (t) thereof and also outputs the speed information v(t) indicating the operation speed thereof. The information processing device 30D trains the first trained model 321D by using, as the training data, the state information SLAVE (t) and the speed information v(t) output from the slave device 10.

According to this aspect, the slave device 10 can autonomously generate new training data, whereby the number of pieces of training data used for training by a human can be significantly reduced.

Fifth Embodiment

Another embodiment of the present invention will be described below. Note that, for convenience of explanation, components having a function identical to those in the above-described embodiment will be denoted by the same reference signs, and descriptions of those components will be omitted.

Figure 14:
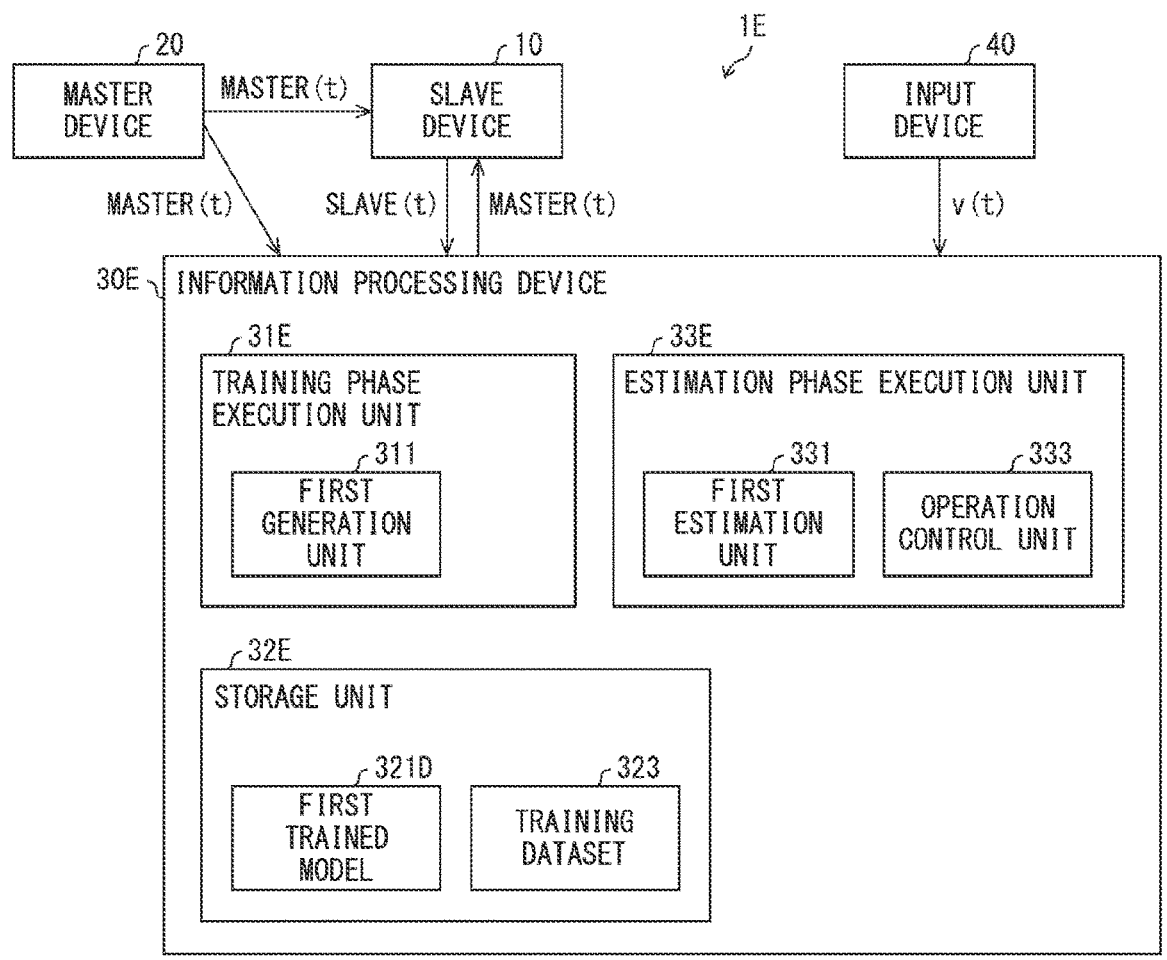
FIG. 14 is a schematic view of a configuration of a system according to a fifth embodiment of the present invention.

FIG. 14 is a diagram schematically illustrating an example of a system 1E according to a fifth embodiment. The system 1E includes the slave device 10, the master device 20, an information processing device 30E, and the input device 40. The information processing device 30E is different from the information processing device 30D according to the fourth embodiment described above in that the second generation unit 312, the second trained model 322, and the second estimation unit 332 are not included.

In the fourth embodiment described above, as in the third embodiment described above, the information processing device 30D controls the operation of the slave device 10 using the plurality of trained models (the first trained model 321D and the second trained model 322) hierarchized. On the other hand, in the present embodiment, the information processing device 30E controls the operation of the slave device 10 using one first trained model 321D instead of the plurality of trained models hierarchized. Specifically, in the present embodiment, the operation of the slave device 10 is controlled using the command information (t+T1) output from the first trained model 321D, instead of the command information (t+T2) output from the second trained model 322.

The operation control unit 333 operates the slave device 10 by supplying the command information MASTER (t+T1) estimated by the first estimation unit 331 to the slave device 10 at the time point (t+T1).

The functions implemented by the information processing device 30E according to the above embodiment may be distributed to and implemented by a plurality of devices. For example, the information processing device 30E may be implemented by a system including a first device including the training phase execution unit 31, a second device including the estimation phase execution unit 33, and a third device including the storage unit 32.

The information processing device 30E according to the present embodiment can be specified as a device including: an estimation unit configured to estimate command information, in accordance with which a control target device operates, by using a trained model that derives, from input data including information indicating a state of the control target device output from the control target device and information including an operation speed and defining an operation instructed to the control target device, the command information supplied to the control target device after the control target device has output the information indicating the state; and an operation control unit configured to operate the control target device by using the command information estimated by the estimation unit.

The information processing device 30E according to the present modified example can be specified as a device including a generation unit configured to generate a trained model trained for a correlation between input information including information indicating a state of a control target device output from the control target device that operates in accordance with command information, and information including an operation speed and defining an operation instructed to the control target device and the command information supplied to the control target device after the control target device has output the information indicating the state, by using a set of the input information and the command information.

Sixth Embodiment

Another embodiment of the present invention will be described below. Note that, for convenience of explanation, components having a function identical to those in the above-described embodiment will be denoted by the same reference signs, and descriptions of those components will be omitted.

Figure 15:
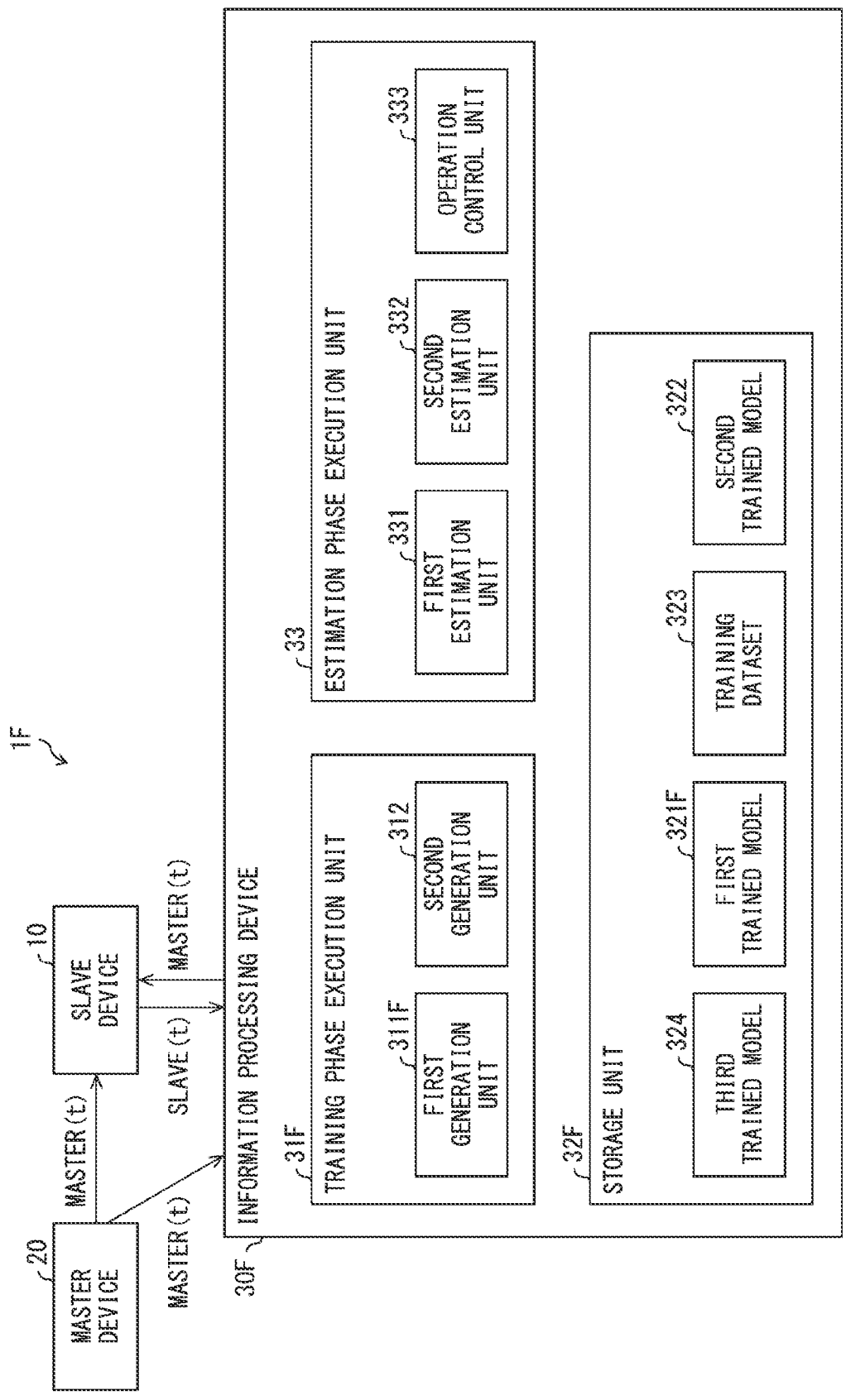
FIG. 15 is a schematic view of a configuration of a system according to a sixth embodiment of the present invention.

FIG. 15 is a schematic view of a configuration of a system 1F according to a sixth embodiment of the present invention. The system 1F includes the slave device 10, the master device 20, and an information processing device 30F. The information processing device 30F is different from the information processing device 30C according to the third embodiment in that a first generation unit 311F is included in place of the first generation unit 311 and that a third trained model 324 is included.

The third trained model 324 is a trained model that derives state information SLAVE (t+T3) using the command information MASTER (t) as input data. The state information SLAVE (t+T3) derived by the third trained model 324 is used as input information for a first trained model 321F. The third trained model 324 can be implemented by, for example, a CNN, an RNN, an LSTM, a DNN, or a combination of these.

Figure 16:
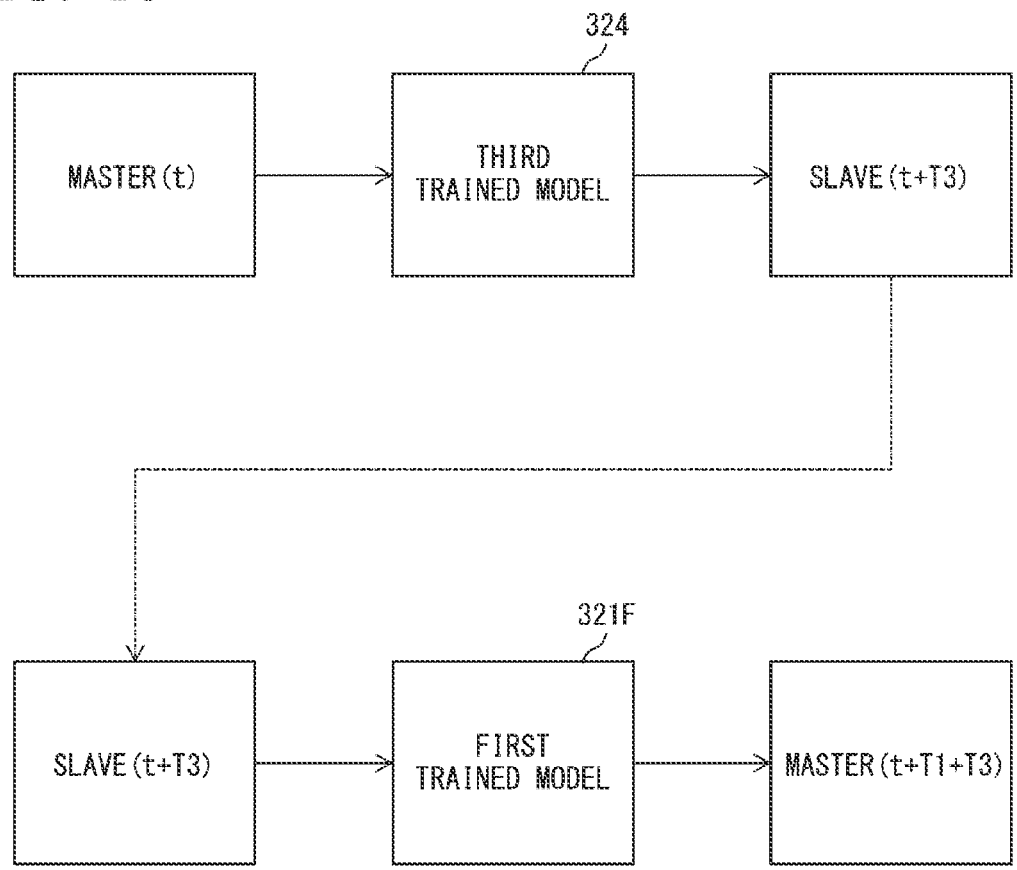
FIG. 16 is a diagram illustrating an example of a relationship between the first trained model and a third trained model.

FIG. 16 is a diagram illustrating an example of a relationship between the first trained model 321F and the third trained model 324. In the figure, when command information MASTER (t) is input to the third trained model 324 as the input data, the third trained model 324 derives state information SLAVE (t+T3). The first generation unit 311F trains the first trained model 321F using, as the training data, a set of the state information SLAVE (t+T3) derived by the third trained model 324 and command information MASTER (t+T1+T3). The state information SLAVE (t+T3) derived by the third trained model 324 is an example of information indicating a second state according to the present embodiment (hereinafter referred to as "second state information").

In the training phase, the first generation unit 311F generates the third trained model 324 trained by using training data (a set of the command information MASTER (t) and the state information SLAVE (t+T3)) stored in the storage unit 32F. The first generation unit 311F generates the first trained model 321F trained by training data (a set of the state information SLAVE (t+T3) and command information MASTER (t+T1+T3)) stored in the storage unit 32F. This state information SLAVE (t+T3) used to generate the first trained model 321F is not the actual state value (state information SLAVE (t+T3)) output from the slave device 10 but is the state information SLAVE (t+T3) derived by the third trained model 324.

The first trained model 321F and the third trained model 324 may be connected to each other and trained at once. Five possible patterns A to E in such a case are listed below.

A. State information SLAVE (t+T1+T3) is output from the state information SLAVE (t). This corresponds to the following flow: the state information SLAVE (t)→the first trained model 321F→the third trained model 324→the state information SLAVE (t+T1+T3).

B. The state information SLAVE (t+T1+T3) is output from the command information MASTER (t). This corresponds to the following flow: the command information MASTER (t)→the third trained model 324→the first trained model 321F→the state information SLAVE (t+T1+T3).

C. A or B described above are repeated a plurality of times (n times). For example, this corresponds to the following flow: the command information MASTER (t)→third trained model 324→the first trained model 321F→ . . . →the third trained model 324→the first trained model 321F→the command information MASTER (t+nT1+nT3); or the state information SLAVE (t)→the first trained model 321F→the third trained model 324→ . . . →the first trained model 321F→the third trained model 324→the state information SLAVE (t+nT1+nT3).

D. A is repeated n times with the step of predicting the state information SLAVE from the last command information MASTER omitted. Thus, prediction of the command information MASTER (t+nT1+(n−1)T3) is performed, starting from the state information SLAVE (t).

E. B described above is repeated n times with the step of predicting the command information MASTER from the last state information SLAVE omitted. Thus, prediction of the state information SLAVE (t+nT3+(n−1)T1) is performed, starting from the command information MASTER (t).

Figure 17:
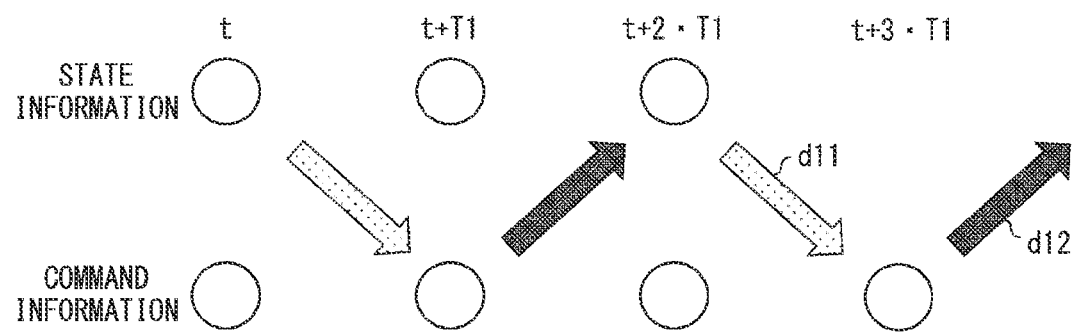
FIG. 17 is a diagram illustrating an example of a relationship between the first trained model and the third trained model.

FIG. 17 is a diagram illustrating an example of a relationship between the first trained model 321F and the third trained model 324 when T1=T3 holds. In the drawing, an arrow d11 indicates a relationship between input and output to and from the first trained model 321F. An arrow d12 indicates a relationship between input and output to and from the third trained model 324. In the example illustrated in FIG. 17, the command information MASTER (t+T1) is derived from the state information SLAVE (t) by the first trained model 321F. The state information (t+2T1) is derived from the command information MASTER (t+T1) by the third trained model 324. When the third trained model 324 is not provided, the first trained model 321F serves an open loop model that predicts the next step. There is no relationship between the response of the first trained model 321F that predicts the command information from the state information (t) and the response of the first trained model 321F that predicts the command information from the state information (t+2T1). When the third trained model 324 is provided, the output of the first trained model 321F that predicts the command information from the state information (t) propagates to the state information (t+2T1), resulting in a closed loop in which the response of the first trained model 321F based on the state information (t) affects the response of the first trained model 321F at the time point (t+T2).

Thus, in the present embodiment, in the training phase for the first trained model 321F, the output from the third trained model 324 is used as the input to the first trained model 321F.

In the estimation phase, the third trained model 324 is not used, and the first trained model 321F (and the second trained model 322) is used to estimate the command information. The estimation processing executed by the first estimation unit 331 and the second estimation unit 332 is the same as the processing described in the second embodiment above, and thus a detailed description thereof is omitted here.

According to the present embodiment, the information processing device 30F performs training using the state information SLAVE (t+T3) derived by the third trained model 324 as input data to the first trained model 321F, to generate the first trained model 321F. This processing corresponds to training modeled as a closed loop in the training phase. On the other hand, in the estimation phase, the information processing device 30F controls the operation of the slave device 10 using the first trained model 321F, and thus a closed loop is formed. Thus, in the training phase, the training can be performed using the same closed loop model as in the estimation phase, whereby the operation of the control target device can be stably predicted.

Seventh Embodiment

Another embodiment of the present invention will be described below. Note that, for convenience of explanation, components having a function identical to those in the above-described embodiment will be denoted by the same reference signs, and descriptions of those components will be omitted.

Figure 18:
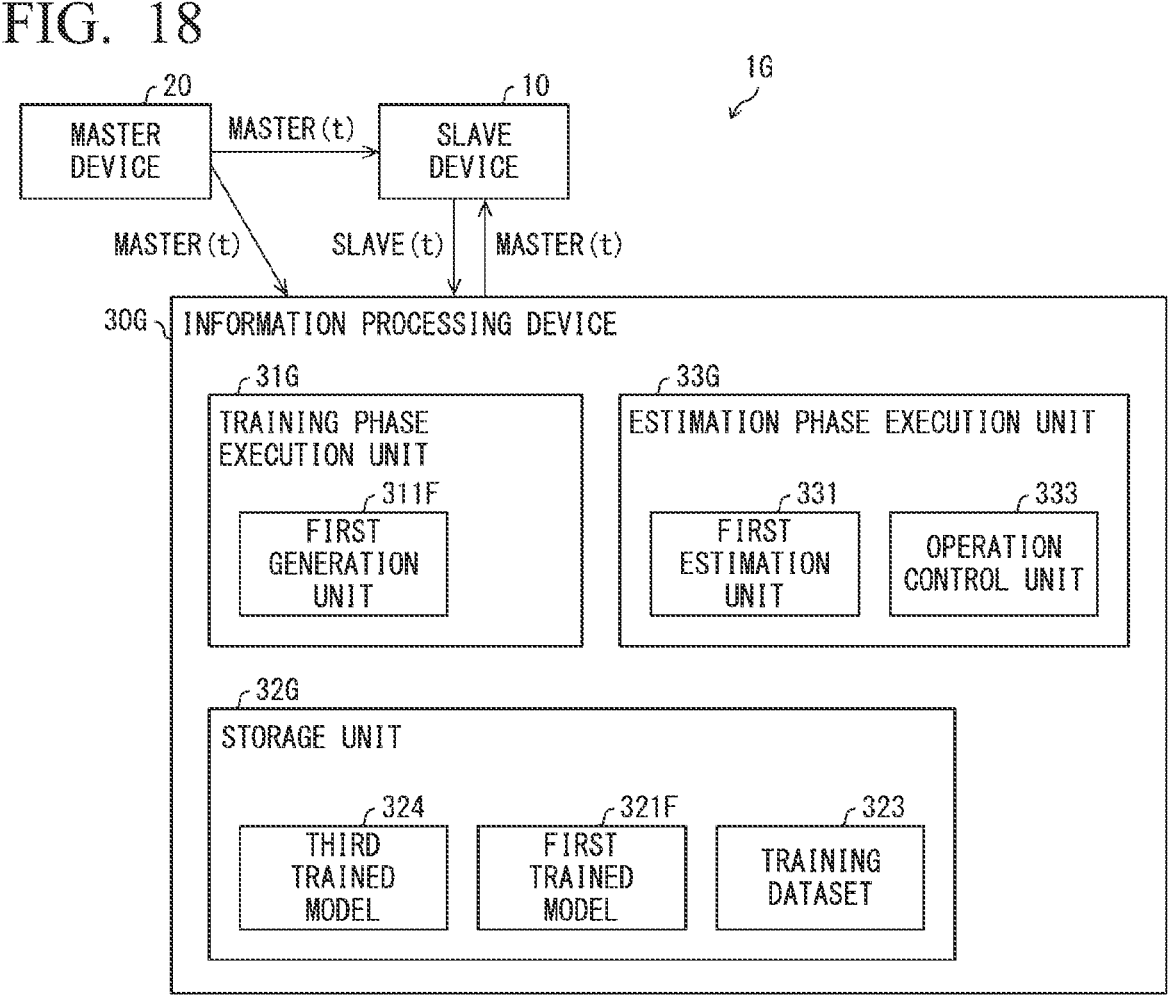
FIG. 18 is a schematic view of a configuration of a system according to a seventh embodiment of the present invention.

FIG. 18 is a diagram schematically illustrating an example of a system 1G according to a seventh embodiment.

The system 1G includes the slave device 10, the master device 20, and an information processing device 30G. The information processing device 30G is different from the information processing device 30F according to the sixth embodiment described above in that the second generation unit 312, the second trained model 322, and the second estimation unit 332 are not included.

In the sixth embodiment described above, as in the third embodiment described above, the information processing device 30F controls the operation of the slave device 10 using the plurality of trained models (the first trained model 321F and the second trained model 322) hierarchized. On the other hand, in the present embodiment, the information processing device 30G controls the operation of the slave device 10 using the first trained model 321F and the third trained model 324, instead of the plurality of trained models hierarchized. Specifically, in the present embodiment, the operation of the slave device 10 is controlled using the command information MASTER (t+T1) output from the first trained model 321F, instead of the command information MASTER (t+T2) output from the second trained model 322.

The operation control unit 333 operates the slave device 10 by supplying the command information MASTER (t+T1) estimated by the first estimation unit 331 to the slave device 10 at the time point (t+T1).

The functions implemented by the information processing device 30G according to the above embodiment may be distributed to and implemented by a plurality of devices. For example, the information processing device 30G may be implemented by a system including a first device including the training phase execution unit 31, a second device including the estimation phase execution unit 33, and a third device including the storage unit 32.

The information processing device 30G according to the present embodiment can be specified as a device including: an estimation unit configured to estimate command information, in accordance with which a control target device operates, by using a first trained model that derives, from information indicating a state of the control target device output from the control target device, the command information supplied to the control target device after the control target device has output the information indicating the state; and an operation control unit configured to operate the control target device by using the command information estimated by the estimation unit, wherein the first trained model is a trained model trained using, as the information indicating the state, information indicating a second state output from the control target device after the command information has been supplied to the control target device, derived by a third trained model that derives information indicating the second state from the command information.

The information processing device 30G according to the present modified example can also be specified as a device including: a first generation unit configured to use a set of information indicating a first state of a control target device that operates based on command information, output from the control target device and the command information supplied to the control target device after the control target device has output the information indicating the first state, to generate a first trained model trained with a correlation between the information indicating the first state and the command information; and a third generation unit configured to use a set of the command information and information indicating a second state indicating a state of the control target device, output from the control target device after the command information has been input to the control target device, to generate a third trained model trained with a correlation between command information and the information indicating the second state, wherein the first generation unit uses the second state information derived for the third trained model as the state information for training the first trained model. The first generation unit 311F according to the present embodiment is an example of the third generation unit.

Eighth Embodiment

Another embodiment of the present invention will be described below. Note that, for convenience of explanation, components having a function identical to those in the above-described embodiment will be denoted by the same reference signs, and descriptions of those components will be omitted.

Figure 19:
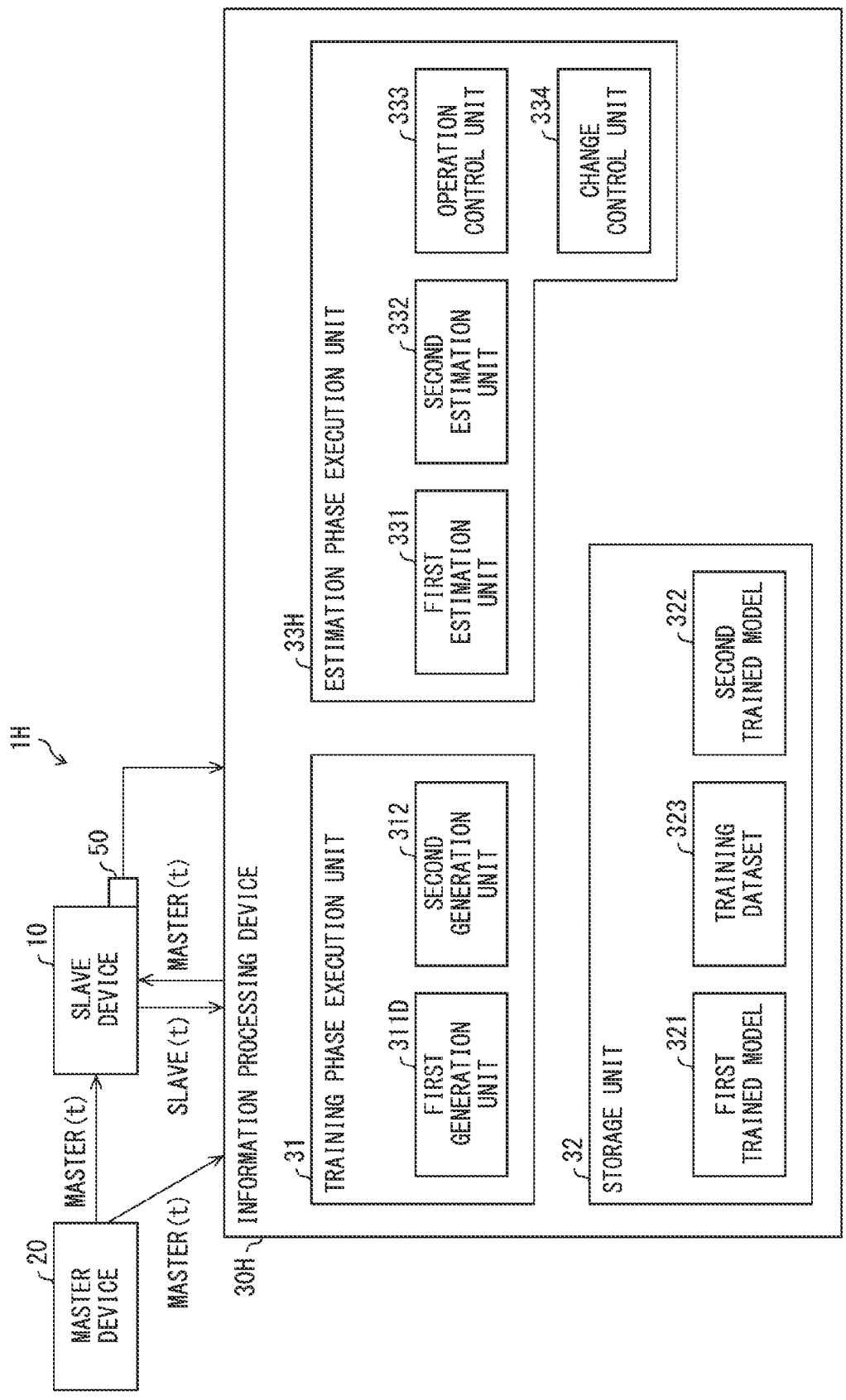
FIG. 19 is a schematic view of a configuration of a system according to an eighth embodiment of the present invention.

FIG. 19 is a diagram schematically illustrating an example of a configuration of a system 1H including an information processing device 30H according to an eighth embodiment of the present invention. The system 1H includes the slave device 10, the master device 20, the information processing device 30H, and a hard/soft sensor 50. The information processing device 30H implements a training phase for generating a trained model for operating the slave device 10, and an estimation phase for operating the slave device 10 by using the trained model trained.

An estimation phase execution unit 33H of the information processing device 30H includes a change control unit 334 in addition to the first estimation unit 331, the second estimation unit 332, and the operation control unit 333. The change control unit 334 changes one or both of the unit of time τ1 and the unit of time τ2 in accordance with the degree of hardness/softness of an object that is a target of an operation performed by the slave device 10. The target object is, for example, an article that is a target of a holding operation, a food material that is a target of a cooking operation, a writing material that is a target of a writing or drawing operation, and an article that is a target of a polishing operation.

Furthermore, the first generation unit with a long unit of time may be mainly in charge of estimating the operation regarding the control and operation for interaction with a low operating frequency environment such as a soft object, and the first generation unit with a short unit of time may be mainly in charge of estimating the operation regarding the control and operation for interaction with a high operating frequency environment such as a hard object.

The hard/soft sensor 50 is provided in the slave device 10, detects the degree of hardness/softness of the target object, and outputs the detected signal to the information processing device 30H.

The change control unit 334 changes one or both of the unit of time τ1 and the unit of time τ2 based on the degree of hardness/softness of the target object detected by the hard/soft sensor 50.

For example, the change control unit 334 may perform control to set the unit of time τ1 and the unit of time τ2 shorter for a harder target object, and to set the unit of time τ1 and the unit of time τ2 longer for a softer target object.

Modified Example

The functions implemented by the information processing device 30H according to the above embodiment may be distributed to and implemented by a plurality of devices. For example, the information processing device 30J may be implemented by a system including a first device including the training phase execution unit 31, a second device including the estimation phase execution unit 33H, and a third device including the storage unit 32.

Ninth Embodiment

Another embodiment of the present invention will be described. Note that, for convenience of explanation, components having a function identical to those in the above-described embodiment will be denoted by the same reference signs, and descriptions of those components will be omitted.

Figure 20:
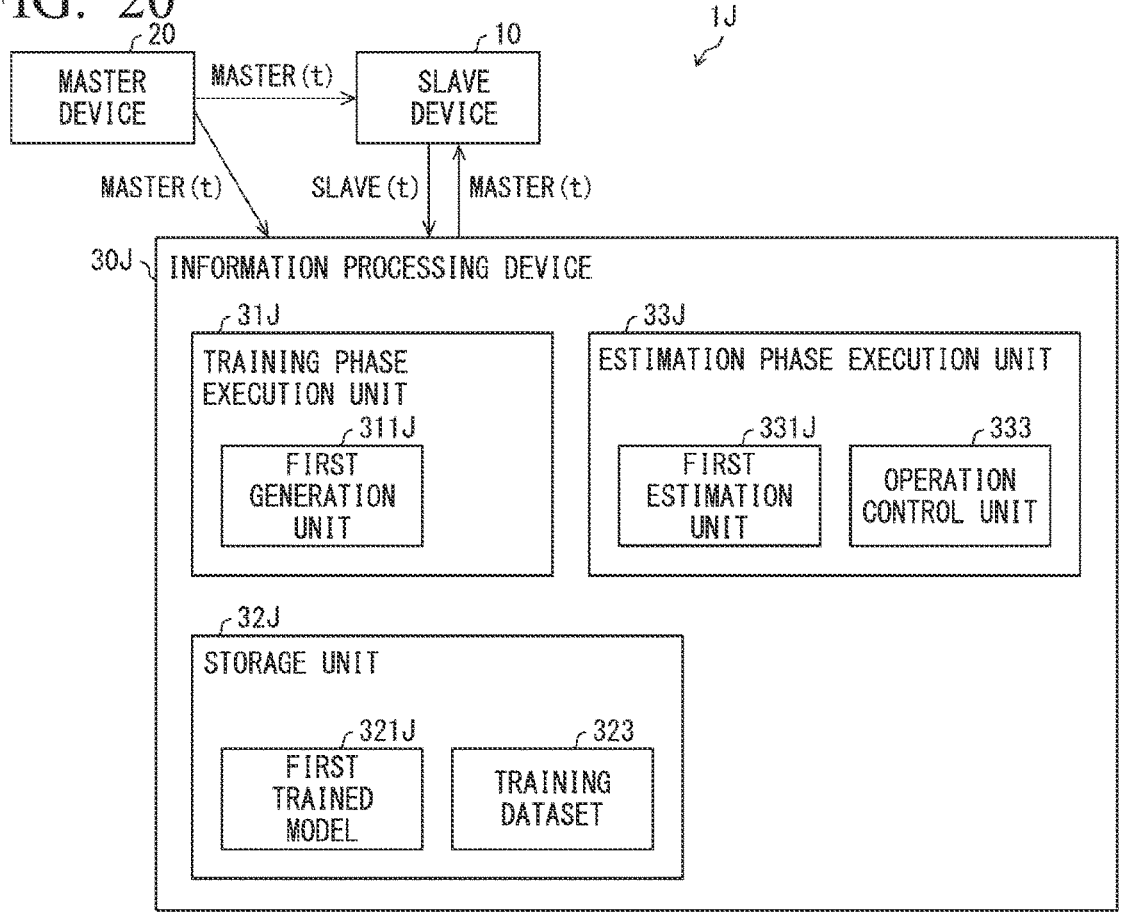
FIG. 20 is a schematic view of a configuration of a system according to a ninth embodiment of the present invention.

FIG. 20 is a diagram schematically illustrating an example of a configuration of a system 1J including an information processing device 30J according to a ninth embodiment of the present invention. The system 1J includes the slave device 10, the master device 20, and the information processing device 30J. The information processing device 30J is different from the seventh embodiment described above in that a first trained model 321J, a first generation unit 311J, and a first estimation unit 331J are included instead of the first trained model 321F, the third trained model 324, the first generation unit 311F, and the first estimation unit 331.

Figure 21:
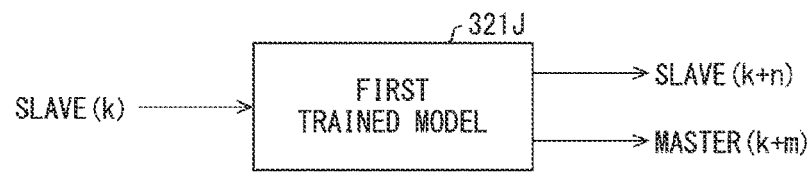
FIG. 21 is a diagram illustrating an example of contents of the first trained model.

FIG. 21 is a diagram illustrating an example of the content of the first trained model 321J. The first trained model 321J is a trained model that receives state information SLAVE (k) as an input and derives state information SLAVE (k+n) and command information SLAVE (k+m).

In the training phase, the first generation unit 311J trains the first trained model 321J using a set of the state information SLAVE (k), the state information SLAVE (k+n), and command information MASTER (k+m) as training data.

The first generation unit 311J trains the first trained model 321J using the state information SLAVE (k+n) output from the first trained model 321J as the training data. Thus, the state information SLAVE (k+n) derived by the first trained model 321J is used as input information for the first trained model 321J.

Figure 22:
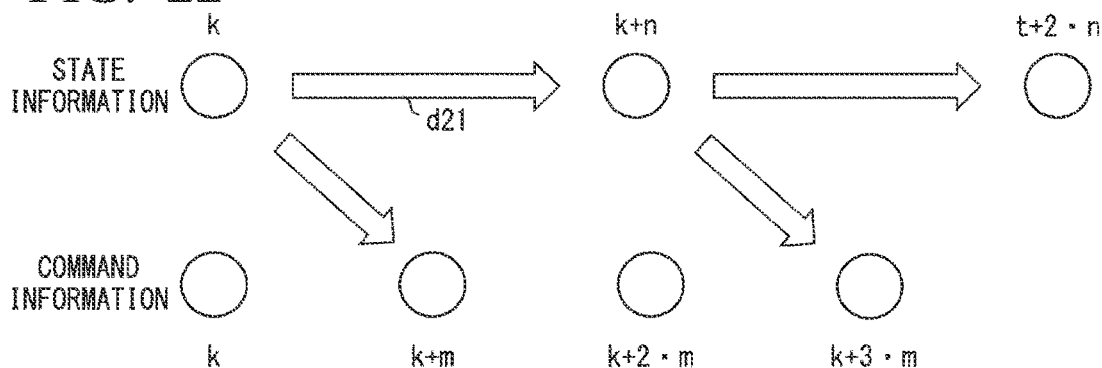
FIG. 22 is a diagram illustrating an example of contents of the first trained model.

FIG. 22 is a diagram illustrating the first trained model 321J. In the drawing, an arrow d21 indicates a relationship between input and output to and from the first trained model 321J. In the example illustrated in FIG. 22, as described above, state information SLAVE (t+n) and the command information MASTER (k+m) are derived from the state information SLAVE (k).

In the estimation phase, the first estimation unit 331J estimates the state information SLAVE (k+n) and the command information MASTER (k+m) from the state information SLAVE (k) using the first trained model 321J per unit of time τ1.

The operation control unit 333 operates the control target device (slave device 10) by using the command information MASTER (k+m) estimated by the first estimation unit 331.

In the present embodiment, the operation of the slave device 10 and the operation of the master device 20 are predicted in combination, whereby a feature amount common to these can be extracted. In addition, in the present embodiment, the training is required for only one first trained model 321J, and thus is easier than that in a case where a plurality of trained models are trained.

The information processing device 30J according to the present embodiment can be specified as a device including: an estimation unit configured to estimate command information, in accordance with which a control target device operates, by using a first trained model that derives the command information supplied to the control target device from information indicating a state of the control target device output from the control target device; and an operation control unit configured to operate the control target device by using the command information estimated by the estimation unit, wherein the first trained model is a trained model that derives, from the information indicating the state, information indicating a second state of the control target device after a predetermined period of time has elapsed, and the command information, and is trained using as input information, the information indicating the second state derived by the first trained model.

Modified Example

First Modified Example

The first trained model 321J is not limited to the configuration described in the ninth embodiment described above and may have another configuration.

Figure 23:
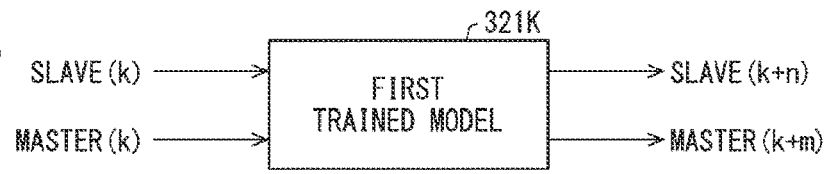
FIG. 23 is a diagram illustrating an example of contents of the first trained model.

FIG. 23 is a diagram illustrating an example of the content of a first trained model 321K according to the present modified example. The first trained model 321K is a trained model that receives state information SLAVE (k) and command information MASTER (k) as an input and derives state information SLAVE (k+n) and command information SLAVE (k+m).

In the training phase, the first generation unit 311J trains the first trained model 321K using a set of the state information SLAVE (k), command information SLAVE (k), the state information SLAVE (k+n), and command information MASTER (k+m) as training data.

The first generation unit 311J trains the first trained model 321J using the state information SLAVE (k+n) and the command information MASTER (k+m) output from the first trained model 321J as the training data. Thus, the state information SLAVE (k+n) and the command information MASTER (k+m) derived by the first trained model 321J are used as input information for the first trained model 321J.

In the estimation phase, the first estimation unit 331J estimates the state information SLAVE (k+n) and the command information MASTER (k+m) from the state information SLAVE (k) and the command information SLAVE (k) using the first trained model 321J per unit of time τ1.

The operation control unit 333 operates the control target device (slave device 10) by using the command information MASTER (k+m) estimated by the first estimation unit 331. In addition, an error in prediction for MASTER (k+m) can be reduced by feeding back information on a difference between this estimated SLAVE (k+n) and the actually measured SLAVE (k+n), such as a difference or a ratio for example, to the prediction value of MASTER (k+m).

In the information processing device 30J according to the present modified example, the first trained model can be specified as a trained model that derives, from the command information and the information indicating the state, information indicating a second state of the control target device after a predetermined period of time has elapsed, and the command information, and is trained using, as input information, the command information and the information indicating the second state derived by the first trained model.

Second Modified Example

The functions implemented by the information processing device 30J according to the above embodiment may be distributed to and implemented by a plurality of devices. For example, the information processing device 30J may be implemented by a system including a first device including the training phase execution unit 31J, a second device including the estimation phase execution unit 33J, and a third device including the storage unit 32J.

Third Modified Example

In the system 13 according to the ninth embodiment, the second generation unit 312, the second trained model 322, and the second estimation unit 332 according to the sixth embodiment described above may be included in the system.

Figure 24:
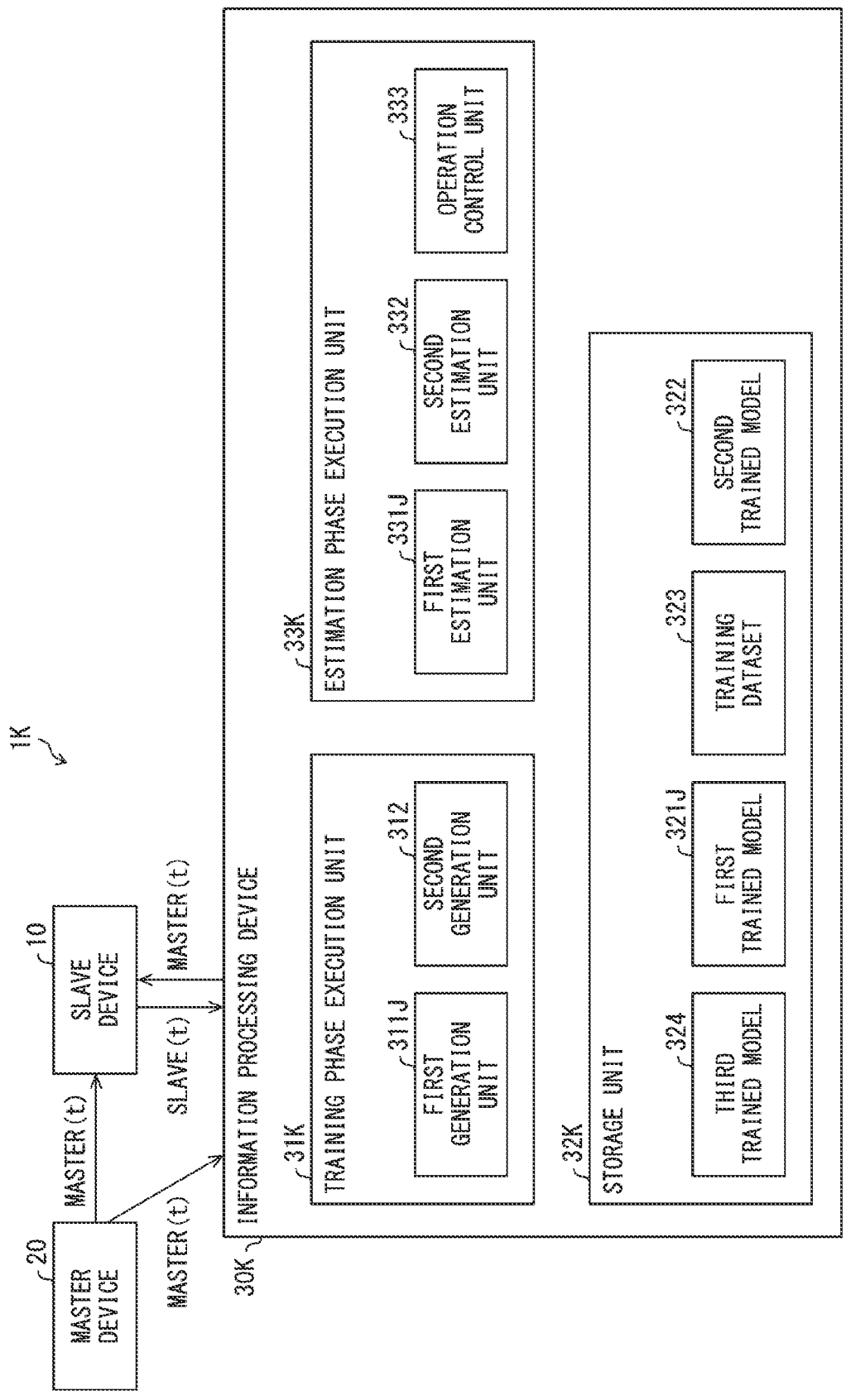
FIG. 24 is a schematic view of a configuration of a system according to a modified example of the ninth embodiment of the present invention.

FIG. 24 is a schematic view of a configuration of a system 1H according to the present modified example. The information processing device 30H of the system 1H is different from the information processing device 30J according to the ninth embodiment described above in that the second generation unit 312, the second trained model 322, and the second estimation unit 332 are included.

In the present modified example, as in the third embodiment described above, the information processing device 30H controls the operation of the slave device 10 using the plurality of trained models (the first trained model 321J and the second trained model 322) hierarchized. Specifically, in the present modified example, the operation of the slave device 10 is controlled using the command information MASTER (t+T2) output from the second trained model 322, instead of the command information MASTER (k+m) output from the first trained model 321J.

In the present modified example, the command information MASTER (k+m) estimated by the first estimation unit 331 and DATA (k+m) calculated based on the command information MASTER (k+m) are used as inputs to the second trained model 322, and command information MASTER (k+T2) is derived by the second trained model 322. The operation control unit 333 controls the operation of the slave device 10 by using the command information MASTER (k+T2) derived by the second trained model 322.

Tenth Embodiment

Figure 25:
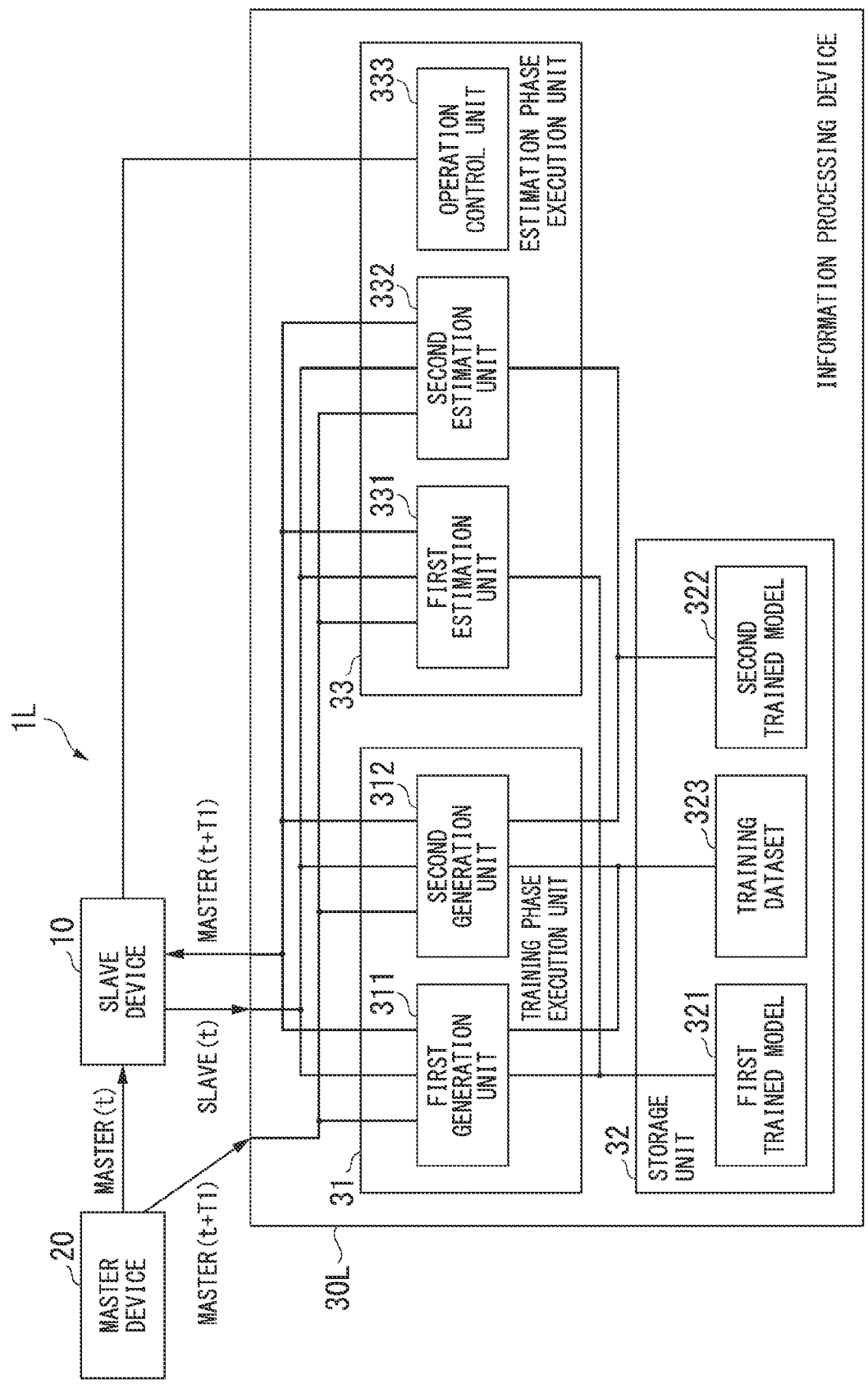
FIG. 25 is a schematic view of a configuration of a system according to a tenth embodiment of the present invention.

FIG. 25 is a diagram schematically illustrating an example of a configuration of a system 1L including an information processing device 30L according to a tenth embodiment of the present invention. The system 1L includes the slave device 10, the master device 20, and the information processing device 30L. The information processing device 30L is a modified example of the information processing device 30C described with reference to FIG. 3. The information processing device 30L will be described with reference to FIG. 25. The same components as those described in the third embodiment above are denoted by the same reference numerals and signs, and the description thereof may be omitted.

The first generation unit 311 generates the first trained model 321 based on the state information SLAVE (t) of the slave device 10 at the time point t, the command information MASTER (t) of the master device 20 at the time point t, and command information MASTER (t+1) of the master device 20 at a time point t+1. The first generation unit 311 may generate the first trained model 321 based on the training dataset 323.

The second generation unit 312 generates the second trained model 322 based on the state information SLAVE (t) of the slave device 10 at the time point t, the command information MASTER (t) of the master device 20 at the time point t, and the command information MASTER (t+1) of the master device 20 at the time point t+1. The first generation unit 311 may generate the first trained model 321 based on the training dataset 323.

The first estimation unit 331 estimates the command information MASTER (t+T1) based on the first trained model 321 trained and the state information SLAVE (t) of the slave device 10 at the time point t.

The second estimation unit 332 estimates the command information MASTER (t+T1) based on the second trained model 322 trained and the state information SLAVE (t) of the slave device 10 at the time point t.

Figure 26:
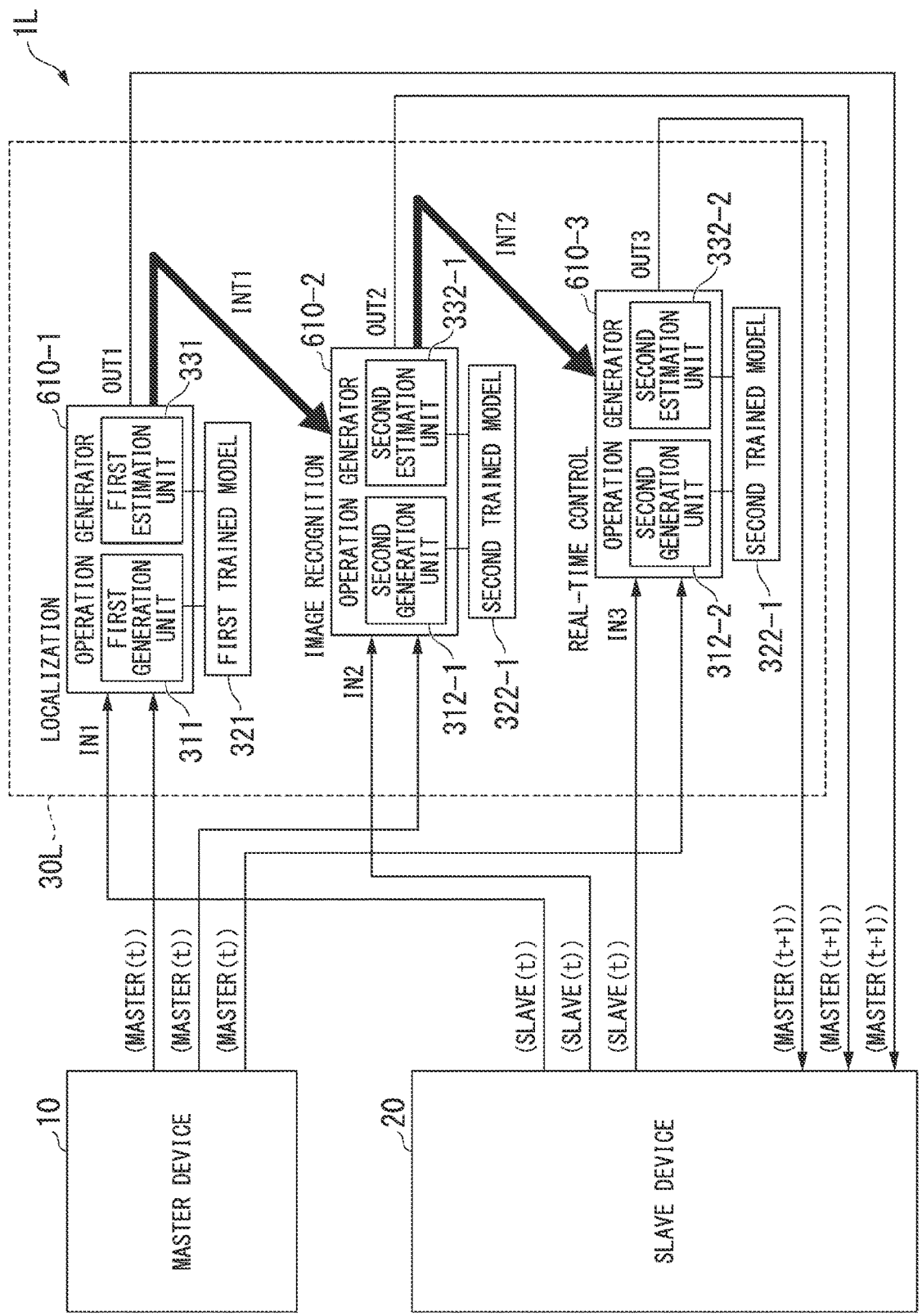
FIG. 26 is a diagram illustrating a functional configuration of the system according to the tenth embodiment of the present invention.

FIG. 26 is a diagram illustrating a functional configuration of the system 1L including the information processing device 30L according to the tenth embodiment of the present invention. An example of the functional configuration of the information processing device 30L will be described with reference to the drawing. The information processing device 30L includes an operation generator 610-1, an operation generator 610-2, and an operation generator 610-3. In the following description, the operation generator 610-1, the operation generator 610-2, and the operation generator 610-3 may be simply referred to as an operation generator 610 when they are not distinguished from each other. Further, the operation generator 610-1 may be referred to as an upper layer with respect to the operation generator 610-3, and the operation generator 610-3 may be referred to as a lower layer with respect to the operation generator 610-1.

The operation generator 610-1 includes the first generation unit 311 and the first estimation unit 331. The operation generator 610-1 generates the first trained model 321 based on the state information SLAVE (t) of the slave device 10, the command information MASTER (t) of the master device 20 at the time point t, and the command information MASTER (t+1) of the master device 20 at the time point t+1. The state information SLAVE (t) of the slave device 10, the command information MASTER (t) of the master device 20 at the time point t, and the command information MASTER (t+1) of the master device 20 at the time point t+1 that are input to the operation generator 610-1 may be referred to as an input signal IN1 when they are not distinguished from each other.

The operation generator 610-1 estimates the command information MASTER (t+T1) based on the first trained model 321 trained and the state information SLAVE (t) of the slave device 10 at the time point t, and outputs the result to the slave device 20. The operation generator 610-1 makes the operation generator 610-2 in the lower layer generate an interrupt INT1 based on the first trained model 321 trained and the state information SLAVE (t) of the slave device 10 at the time point t. The signal output from the operation generator 610-1 may be referred to as an output signal OUT1.

The operation generator 610-2 includes a second generation unit 312-1 and a second estimation unit 332-2. The operation generator 610-2 generates a second trained model 322-1 based on the state information SLAVE (t) of the slave device 10, the command information MASTER (t) of the master device 20 at the time point t, and the command information MASTER (t+1) of the master device 20 at the time point t+1. The state information SLAVE (t) of the slave device 10, the command information MASTER (t) of the master device 20 at the time point t, and the command information MASTER (t+1) of the master device 20 at the time point t+1 that are input to the operation generator 610-2 may be referred to as an input signal IN2 when they are not distinguished from each other.

The operation generator 610-2 estimates the command information MASTER (t+T1) based on the second trained model 322-1 trained and the state information SLAVE (t) of the slave device 10 at the time point t, and outputs the result to the slave device 20. The operation generator 610-2 makes the operation generator 610-3 in the lower layer generate an interrupt INT2 based on the second trained model 322 trained and the state information SLAVE (t) of the slave device 10 at the time point t. The signal output from the operation generator 610-2 may be referred to as an output signal OUT2.

The operation generator 610-3 includes a second generation unit 312-2 and the second estimation unit 332-2. The operation generator 610-3 generates a second trained model 322-2 based on the state information SLAVE (t) of the slave device 10, the command information MASTER (t) of the master device 20 at the time point t, and the command information MASTER (t+1) of the master device 20 at the time point t+1. The state information SLAVE (t) of the slave device 10, the command information MASTER (t) of the master device 20 at the time point t, and the command information MASTER (t+1) of the master device 20 at the time point t+1 that are input to the operation generator 610-3 may be referred to as an input signal IN3 when they are not distinguished from each other.

The operation generator 610-3 estimates the command information MASTER (t+T1) based on the second trained model 322-2 trained and the state information SLAVE (t) of the slave device 10 at the time point t, and outputs the result to the slave device 20. The signal output from the operation generator 610-3 may be referred to as an output signal OUT3.

Figure 27:
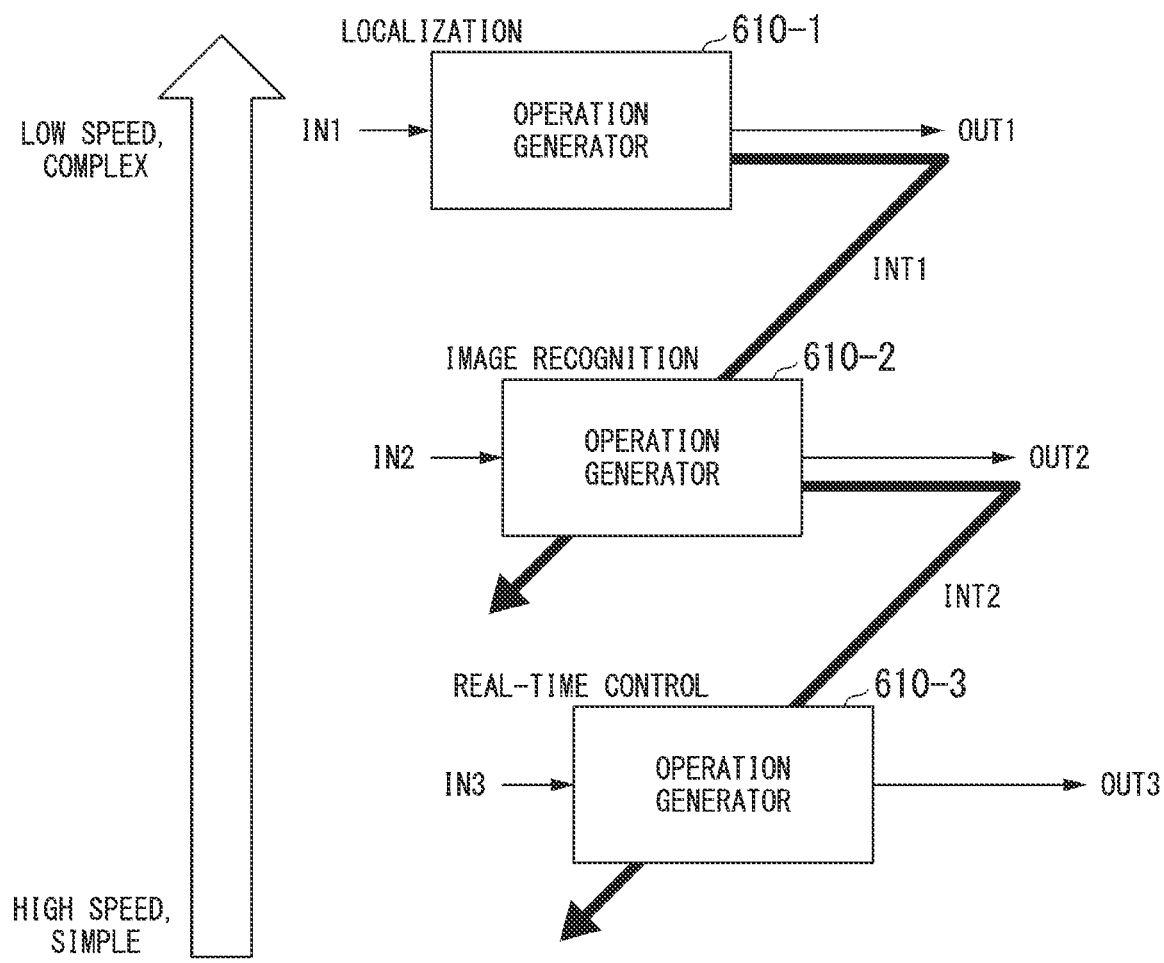
FIG. 27 is a schematic view illustrating hierarchized operation generators according to the tenth embodiment of the present invention in more detail.

FIG. 27 is a schematic view illustrating the hierarchized operation generator 610 according to the tenth embodiment of the present invention in more detail. The hierarchized operation generators 610 according to the tenth embodiment will be described in more detail with reference to the drawing.

The operation generator 610-1 performs localization, for example. The localization may be, for example, estimation of the position of a writing material held by the slave device 20 in an example of a case where the slave device 20 writes characters using a writing material. Since the operation generator 610-1 is the operation generator 610 in the highest layer, the operation generator 610-1 performs estimation for an operation only requiring a certain degree of accuracy due to a slower frequency than the other operation generators 601 in the lower layers.

The operation generator 610-2 performs, for example, image recognition. For example, the image recognition may be, in an example where the slave device 20 writes a character using a writing material, performed for the character written on paper or for the paper on which the character is to be written. Since the operation generator 610-2 is located between the operation generator 610 in the upper layer and the operation generator 610 in the lower layer, it estimates an operation that requires a frequency higher than that of the operation generator 610 in the upper layer and a frequency lower than that of the operation generator 610 in the lower layer.

The operation generator 610-3 performs, for example, real-time control. For example, in an example of a case where the slave device 20 writes a character using a writing material, the real-time control may be an estimation of an operation that requires real-time control, such as a force holding the writing material or a moving speed of the writing material. Since the operation generator 610-3 is the operation generator 610 in the lowest layer, the operation generator 610-3 estimates an operation that requires more accuracy with a higher frequency than that in the operation generator 610 in the upper layers.

Thus, the operating frequency of the operation generator 610-1 is lower than the operating frequency of the operation generator 610-2, and the operating frequency of the operation generator 610-2 is lower than the operating frequency of the operation generator 610-3. Further, the operation generator 610-1 controls a more complicated operation than the operation generator 610-2, and the operation generator 610-2 controls a more complicated operation than the operation generator 610-3. Thus, according to the present embodiment, the operation generator 610 in the upper layer controls a complicated operation at a lower speed than the operation generator 610 in the lower layer, and the operation generator 610 in the lower layer controls a simple operation at a higher speed than the operation generator 610 in the upper layer.

According to the present embodiment, by generating an interrupt from the operation generator 610 in the upper layer to the operation generator 610 in the lower layer, each operation generator 610 can be individually trained based on its operation. For example, the operation generator 610 to control a slow and complicated operation such as localization is trained at a low frequency. The operation generator 610 to perform control for a simple and fast operation as in the case of real-time control is trained at a high frequency. When the training for a slow and complicated operation is performed at a high frequency, a huge amount of storage capacity may be consumed. When the training for a fast and simple operation is performed at a low frequency, an error due to insufficient sampling frequency may be large. In the present embodiment, by hierarchizing the trained models according to their operations, training can be performed at a frequency suitable for each operation. Thus, the memory capacity is not wastefully consumed.

Figure 28:
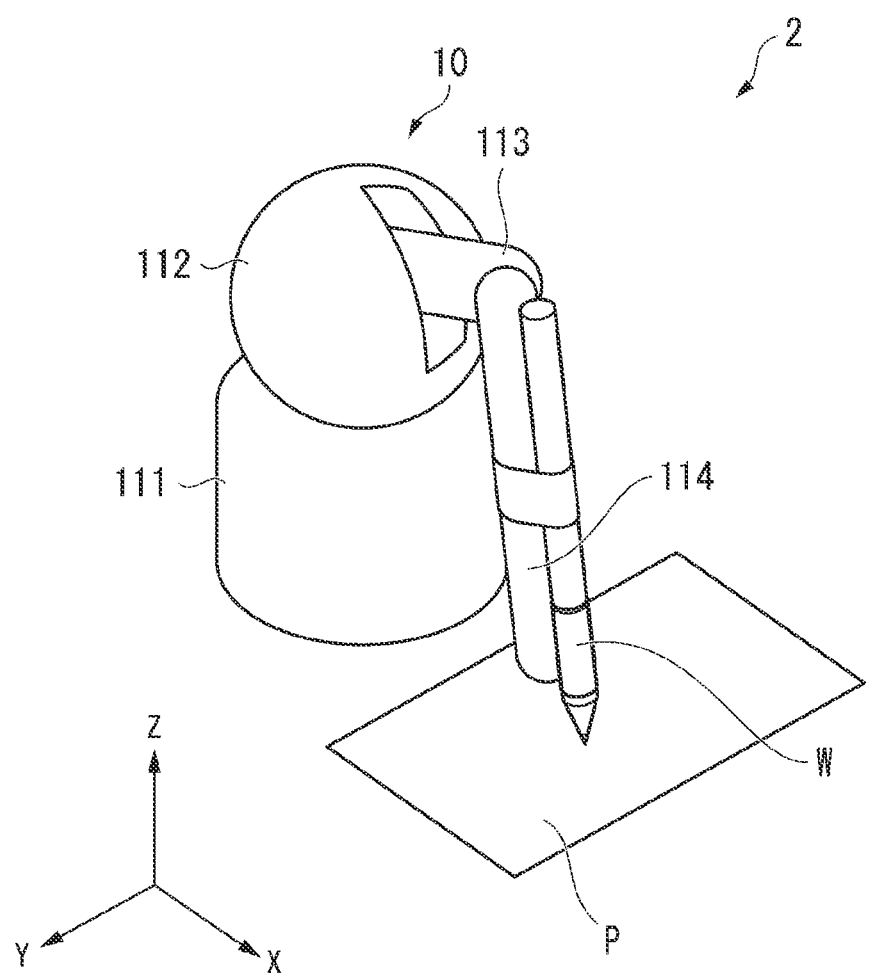
FIG. 28 is a diagram schematically illustrating an example of a case where a slave device according to the tenth embodiment of the present invention writes a character using a writing material.

FIG. 28 is a diagram schematically illustrating an example of a case where the slave device according to the tenth embodiment of the present invention writes a character using a writing material. As a specific example for describing the effect of the present embodiment, an example of a case where the system 2 makes the slave device 10 write a character using a writing material W will be described. The slave device 10 in FIG. 28 is different from the slave device 10 illustrated in FIG. 5 in that the slave device 10 includes the writing material W instead of the eraser E. The slave device 10 writes a character on the paper surface P using the writing material W.

Figure 29:
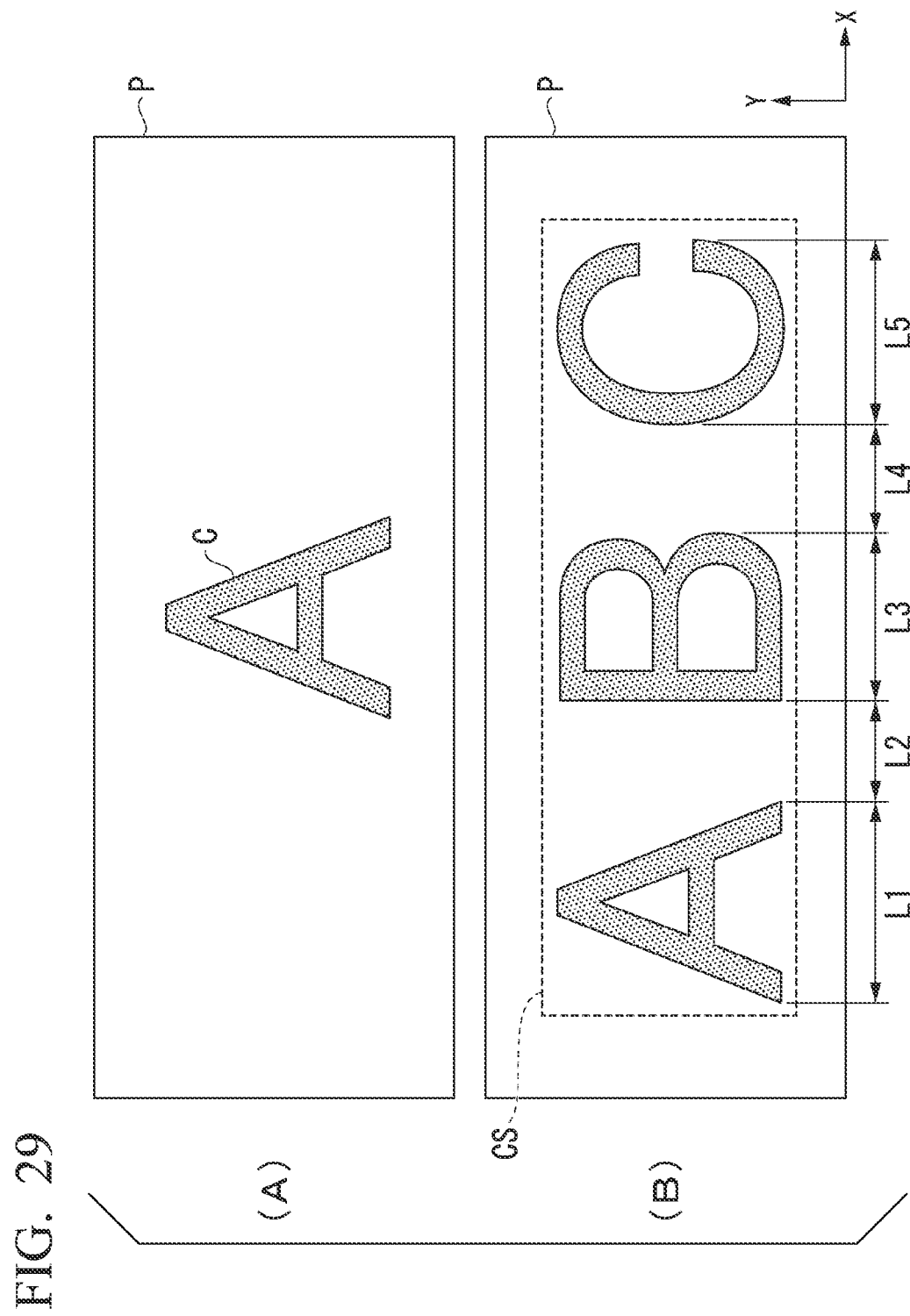
FIG. 29 is a diagram schematically illustrating an example of characters written on a paper surface by the slave device according to the tenth embodiment of the present invention.

FIG. 29 is a diagram schematically illustrating an example of characters written on a paper surface by the slave device according to the tenth embodiment of the present invention. The slave device 10 according to the present embodiment may write, for example, a character C as illustrated in FIG. 29(A) or a character string CS as illustrated in FIG. 29(B). In the example illustrated in the drawing, a direction in which the character strings CS are arranged may be referred to as an x-axis direction, and a direction orthogonal to the x-axis direction may be referred to as a y direction.

In the example illustrated in FIG. 29(A), the character C written by the slave device 10 is the alphabet "A". In the example illustrated in FIG. 29(B), the character string CS written by the slave device 10 is the alphabets "ABC". To write the character string "ABC", the writing material W needs to be moved from a location where the character C is written to a location where the next character C is written. In the example illustrated in FIG. 29(B), after writing the alphabet "A" in a range L1 on the x axis, the slave device 10 moves the writing material W in the x-axis direction by a distance L2 and writes the next alphabet "B". After writing the alphabet "B" in a range L3 on the x axis, the slave device 10 moves the writing material W in the x-axis direction by a distance L4 and writes the next alphabet "C".

The operating frequency for these operations of writing the characters in the ranges L1, L2, and L3 is preferably high. On the other hand, the operating frequency for the movement in the x-axis direction by the distance L2 or L4 may be low, and is preferably low considering the amount of memory consumed, the amount of time required for the training, and the like. As described above, when the slave device 10 writes the character string CS, there is both a case where the operating frequency is preferably high and a case where the operating frequency is preferably low. According to the present embodiment, by hierarchizing the operation generators 610, training for the respective operations can be performed at suitable operating frequencies.

Eleventh Embodiment

Figure 30:
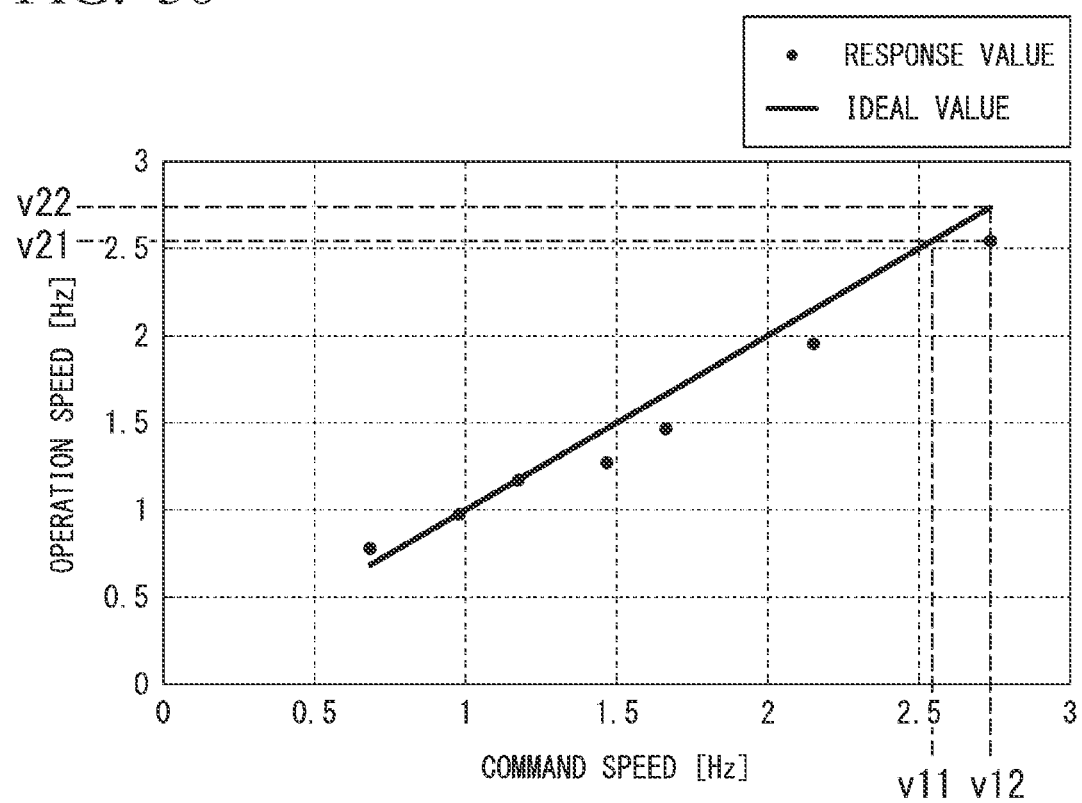
FIG. 30 is a diagram illustrating an ideal value and a response value in a case where a system according to an eleventh embodiment of the present invention is used.

FIG. 30 is a diagram illustrating an ideal value and a response value in a case where a system according to an eleventh embodiment of the present invention is used. The eleventh embodiment is a modified example of the fourth embodiment. A system according to the eleventh embodiment will be described in more detail with reference to the drawing. In the present embodiment, the slave device 10 trains the first trained model 321D through comparison between information on the speed at which the slave device 10 is scheduled to operate (thus, the command speed) and the measured operation speed of the slave device 10 (thus, the operation speed) as a result of the operation. The example illustrated in FIG. 30 illustrates a correspondence relationship between the command speed and the operation speed.

FIG. 30 illustrates an ideal value and a response value. The ideal value is a value with which the command speed and the operation speed match. For example, when the command speed is a speed v12, the ideal value of the operation speed is a speed v22. However, in this example, the actual operation speed with the command speed being the speed v12 is a speed v21. In this case, a speed v11 that is the ideal value of the command speed corresponding to the actual operation speed v21 is used as the speed for training the first trained model 321D, which has been the speed v12, as the command speed.

In the present embodiment, the input information and the output information to and from the first trained model 321 are speed. Thus, the input information and the output information to and from the first trained model 321 are values that can be quantitatively expressed. This means that the first trained model 321 can perform autonomous training based on the relationship between the input information and the output information. With the configuration according to the present embodiment, the information processing device 30D can easily train the first trained model 321.

State Prediction According to Sixth Embodiment and Ninth Embodiment

The state prediction described with reference to FIG. 17 in the sixth embodiment and the state prediction described with reference to FIG. 22 in the ninth embodiment will be described in more detail with reference to FIG. 31 to FIG. 34.

Figure 31:
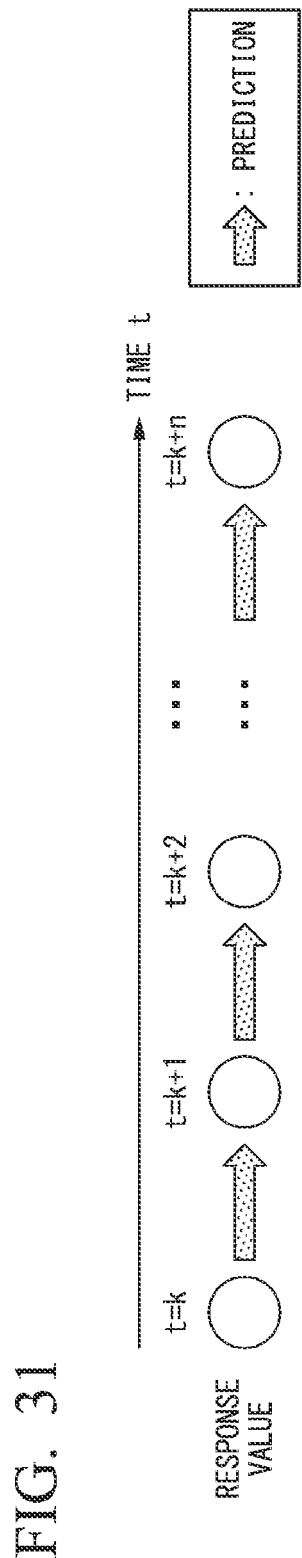
FIG. 31 is a diagram illustrating state prediction using a known technique.

FIG. 31 is a diagram illustrating state prediction using a known technique. A state of the control target device and prediction of the state in the future will be described with reference to the drawing. In the description with reference to the drawing, the horizontal axis represents time t. According to a known technique, the control target device can predict the state thereof in the future because the input and output values are the same due to the absence of the slave device and the master device. Specifically, according to the known technique, the state at a time point t=k+1 can be predicted in the state at a time point t=k, and the state at a time point t=k+2 can be predicted in the state at the time point t=k+1 by using the result of the prediction for the device as an initial value. Thus, according to the known technique, based on the state of the device, the state in the future is predicted, meaning that no error is accumulated even when the state in the far future is to be predicted.

Figure 32:
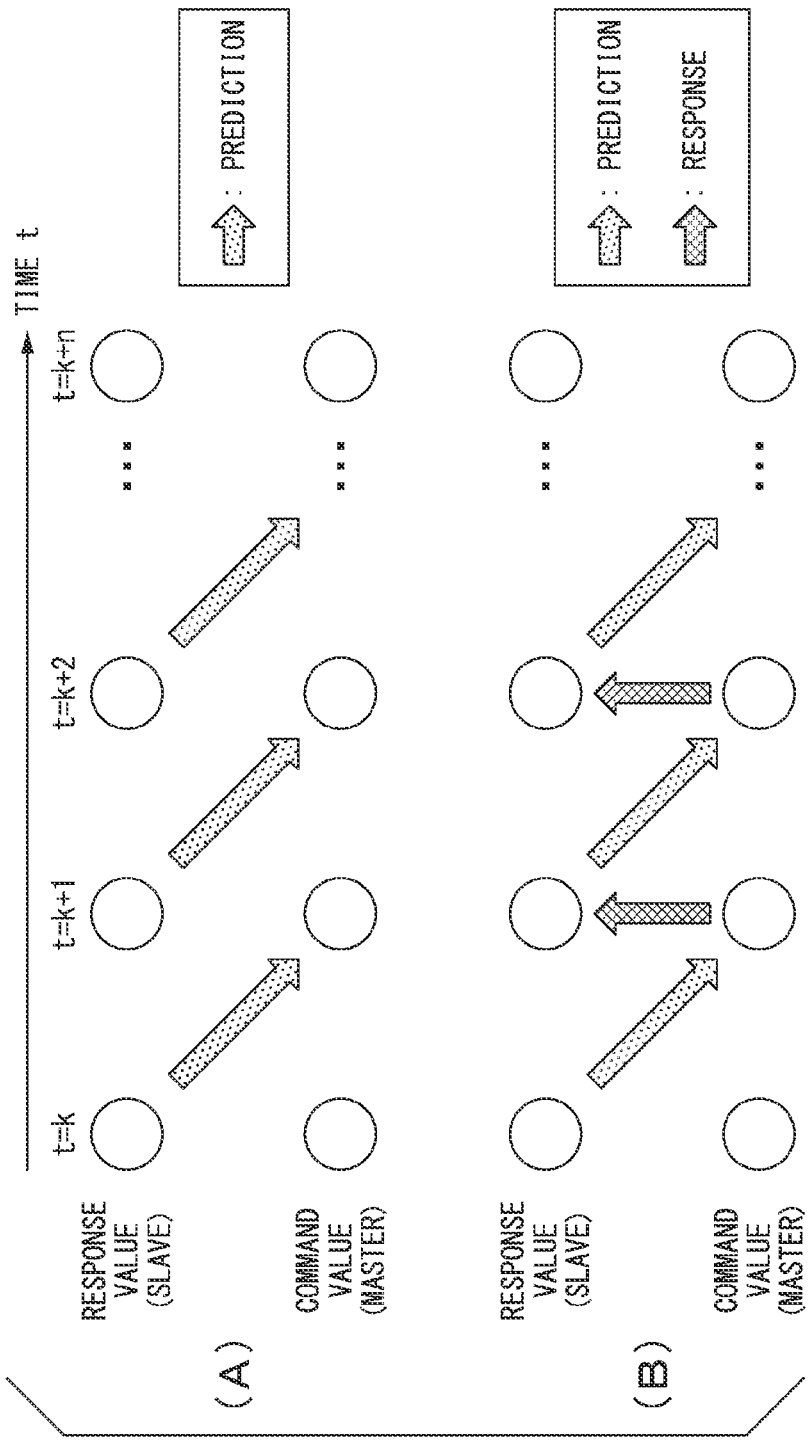
FIG. 32 is a diagram illustrating a problem of error accumulation according to the present invention.

FIG. 32 is a diagram illustrating a problem of error accumulation according to the present invention. A state of the control target device and prediction of the state in the future in a case where the slave device 10 and the master device 20 are provided will be described with reference to the drawing. FIG. 32(A) illustrates an example at the time of training, and FIG. 32(B) illustrates an example at the time of execution.

First, future prediction at the time of training will be described with reference to FIG. 32(A). At the time of training, the trained model predicts a state of the master device 20 in the future (for example, a state of the master device 20 at the time point t=k+1) based on a certain state of the slave device 10 (for example, a state of the slave device 10 at the time point t=k). The trained model predicts a state of the master device 20 further in the future (for example, a state of the master device 20 at the time point t=k+2) based on a state of the slave device 10 at the time point t=k+1). Thus, an open loop is formed since the state predicted by the trained model at the time point t=k and the state predicted at the time point t=k+1 are independent from each other.

Next, future prediction at the time of execution will be described with reference to FIG. 32(B). At the time of execution, the trained model predicts a state of the master device 20 in the future based on the state of the slave device 10 and the response from the master device 20. For example, at the time point t=k+1, the trained model predicts the state of the master device 20 at the time pointt=k+2 based on the state of the slave device 10 at the time point t=k+1 and the response from the master device 20. Thus, a closed loop is formed since the state in the future is predicted at the time point t=k+1 based on the result of the operation based on the state predicted by the trained model at the time point t=k. Thus, the model illustrated in FIG. 32 has a problem in that the model at the time of training and the model at the time of execution are different from each other. With the model illustrated in FIG. 32, an open loop is formed at the time of training and a closed loop is formed at the time of execution, resulting in an error at the time of execution not taken into consideration at the time of training. Such an error accumulates to lead to a problem in that prediction for the state in the far future fails to be accurately performed. The control may be unstable if such an error is large.

Figure 33:
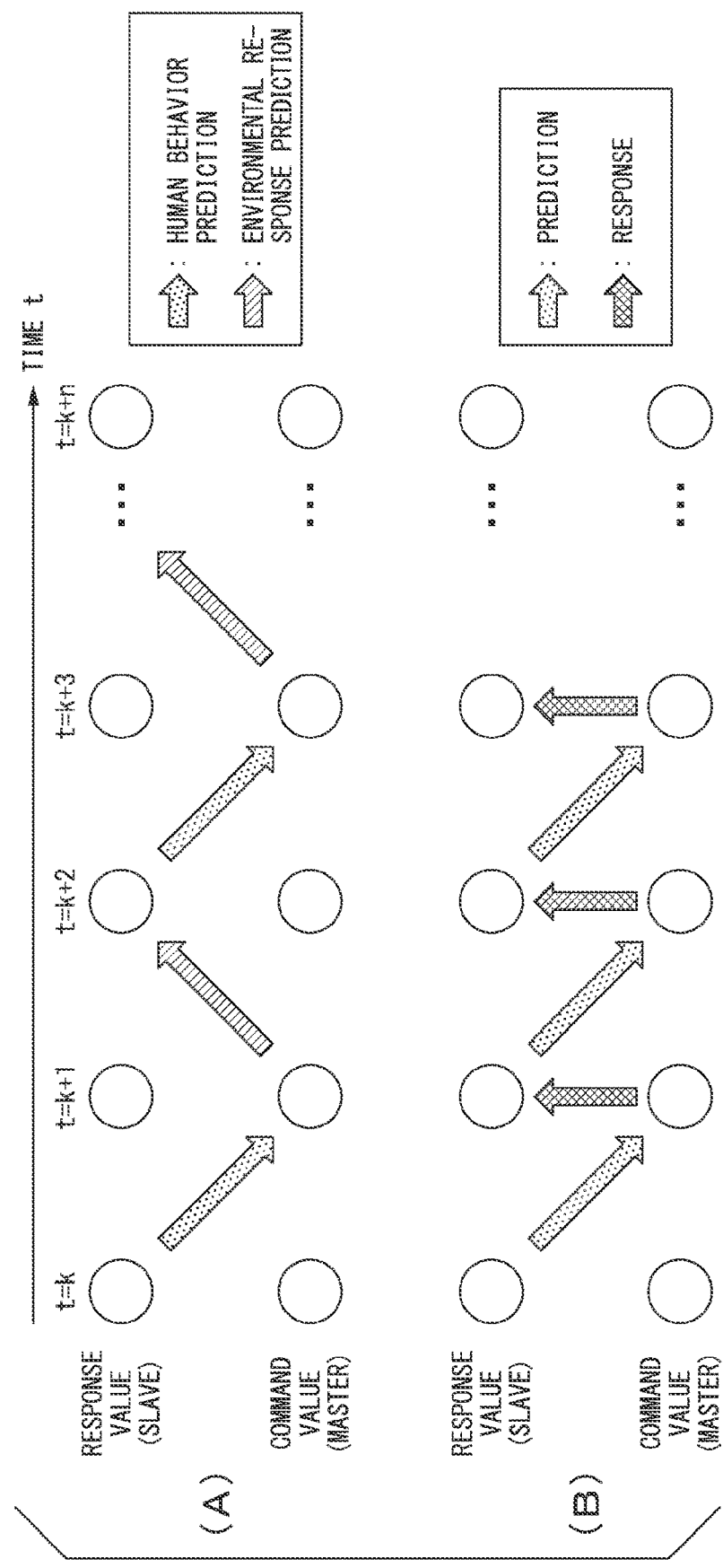
FIG. 33 is a diagram illustrating state prediction using the sixth embodiment of the present invention.

FIG. 33 is a diagram illustrating a state prediction according the sixth embodiment of the present invention. The state prediction according to the sixth embodiment of the present invention aims to solve the problem described with reference to FIG. 32. A state of the control target device and prediction of the state in the future according to the sixth embodiment of the present invention will be described with reference to the FIG. 33. FIG. 33(A) illustrates an example at the time of training, and FIG. 33(B) illustrates an example at the time of execution.

First, future prediction at the time of training will be described with reference to FIG. 33(A). At the time of training, the trained model predicts the state of the master device 20 at the time point t=k+1 based on the state of the slave device 10 at time point t=k (hereinafter, prediction of the state of the master device 20 based on the state of the slave device 10 is referred to as "human behavior prediction"). In addition, the trained model predicts the state of the slave device 10 at time point t=k+2 based on the state of the master device 20 at the time point t=k+1 (hereinafter, prediction of the state of the slave device 10 based on the state of the master device 20 is referred to as "environmental response prediction"). Thus, in the present embodiment, the state predicted by the trained model at the time point t=k and the response based on the expectation are predicted.

Next, future prediction at the time of execution will be described with reference to FIG. 33(B). At the time of execution, the trained model predicts a state of the master device 20 in the future based on the state of the slave device 10 and the response from the master device 20. For example, at the time point t=k+1, the trained model predicts the state of the master device 20 at the time pointt=k+2 based on the state of the slave device 10 at the time point t=k+1 and the response from the master device 20. Thus, a closed loop is formed since the state in the future is predicted at the time point t=k+1 based on the result of the operation based on the state predicted by the trained model at the time point t=k. Still, in the present embodiment, the response from the master device 20 at the time point t=k+1 has already been predicted by "environmental response prediction", meaning that no error accumulates. Thus, with the model illustrated FIG. 31, the state in the future can be more accurately predicted.

With the model illustrated in FIG. 33, "environmental response prediction" used for the training at the time of training is not used at the time of execution. Thus, with the model illustrated in FIG. 33, since the "environmental response prediction" is not used at the time of execution, there is a problem in that the data collected using time and memory capacity at the time of training cannot be utilized at the time of execution.

Figure 34:
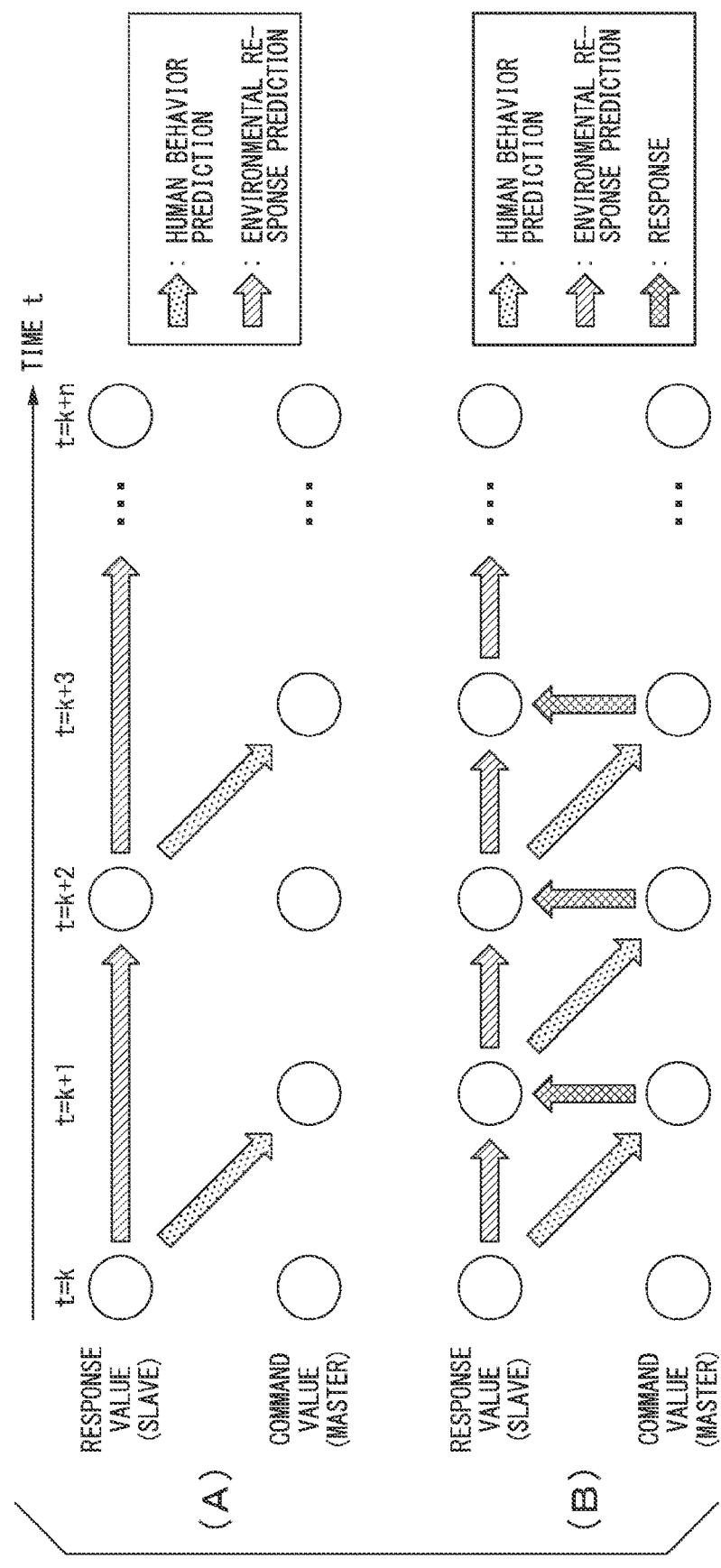
FIG. 34 is a diagram illustrating state prediction using the ninth embodiment of the present invention.

FIG. 34 is a diagram illustrating a state prediction according the ninth embodiment of the present invention. The state prediction according to the sixth embodiment of the present invention aims to overcome the problem newly arising with the method described with reference to FIG. 33. A state of the control target device and prediction of the state in the future according to the ninth embodiment of the present invention will be described with reference to the FIG. 34. FIG. 34(A) illustrates an example at the time of training, and FIG. 34(B) illustrates an example at the time of execution.

First, future prediction at the time of training is described with reference to FIG. 34(A). At the time of training, the trained model predicts the state of the master device 20 at the time point t=k+1 and the state of the slave device 10 at the time point t=k+2 based on the state of the slave device 10 at the time point t=k. Thus, in the present embodiment, the trained model predicts the state of the master device 20 after a predetermined time has elapsed and the state of the slave device 10 at a time point further in the future after the elapse of the predetermined period of time based on the state of the slave device 10. The present embodiment is different from the example illustrated FIG. 33 in that the "environmental response prediction" is performed based on the state of the slave device 10.

Next, future prediction at the time of execution will be described with reference to FIG. 34(B). At the time of execution, the trained model predicts the state of the slave device 10 in the future and the state of the master device 20 in the future, based on the current state of the slave device 10, the response from the master device 20, the state predicted from the state of the slave device 10 in the past. For example, at the time point t=k+1, the trained model predicts the state of the master device 20 at the time point t=k+2 and the state of the slave device 10, based on the state of the slave device 10 at the time point t=k+1, the response from the master device 20, and the state of the slave device 10 predicted at the time point t=k. Thus, according to the present embodiment, the control can be performed based on the actual response and the information predicted in the past, whereby the state in the future can be more accurately predicted.

Twelfth Embodiment

Figure 35:
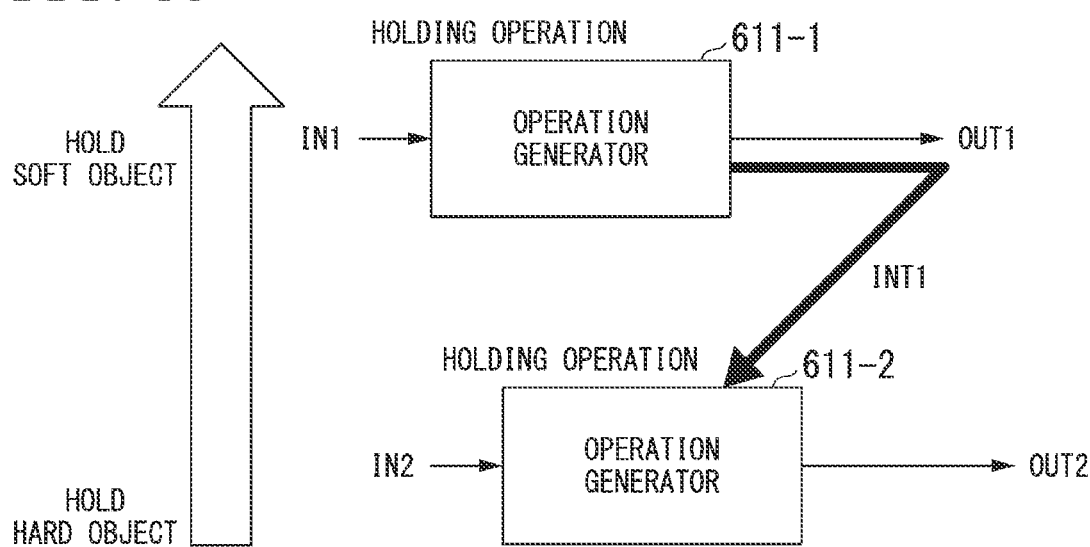
FIG. 35 is a schematic view illustrating hierarchized trained models according to a twelfth embodiment of the present invention in more detail.

FIG. 35 is a schematic view illustrating hierarchized trained models according to a twelfth embodiment of the present invention in more detail. The twelfth embodiment is a modified example of the eighth embodiment. A system according to the twelfth embodiment will be described with reference to the drawing. In the eighth embodiment, an example is described where the system 1H includes the hard/soft sensor 50, and changes one or both of the unit of time τ1 and the unit of time τ2 based on the degree of hardness/softness of an article that is the target of the holding operation. The twelfth embodiment is different from the eighth embodiment in that the hard/soft sensor 50 is not included.

In the twelfth embodiment, the information processing device 30H includes a plurality of trained models, and different trained models are trained in accordance with hardness/softness of an object to be a target of a holding operation. Specifically, the information processing device 30H includes a plurality of operation generators 611-n (n is an integer of 1 or more). In the example illustrated in FIG. 35, an operation generator 611-1 and an operation generator 611-2 are included. The operation generator 611-1 and the operation generator 611-2 both perform the holding operation. The operating frequency of the operation generator 611-1 is lower than that of the operation generator 611-2, and the operating frequency of the operation generator 611-2 is higher than that of the operation generator 611-1.

Here, in an operation of holding an object, a sampling time suitable for training varies depending on the hardness/softness of the object. For example, the sampling time in a case of holding a soft object may be longer than the sampling time in a case of holding a hard object. In the present embodiment, in the slave device 10, the operation generator 611-1 with a low operating frequency is trained for the operation of holding a soft object, and the operation generator 611-2 with a high operating frequency is trained for the operation of holding a hard object. Thus, in the present embodiment, for the slave device 10, the trained model trained varies depending on the hardness/softness of the object.

The configuration in the twelfth embodiment is similar to the hierarchical structure described in the tenth embodiment but is different from the tenth embodiment in that the trained model trained varies depending on the operation of the device in the tenth embodiment, and the trained model trained varies depending on the object to be held in the twelfth embodiment. A configuration as a combination between the configuration of the tenth embodiment and the configuration of the twelfth embodiment may be used.

With the configuration as in the twelfth embodiment, the trained model can be trained with a more suitable sampling time. According to the twelfth embodiment, since the trained model can be trained with a more suitable sampling time, the amount of time required for the training as well as the memory capacity required for storing the trained model can be reduced.

Thirteenth Embodiment

Figure 36:
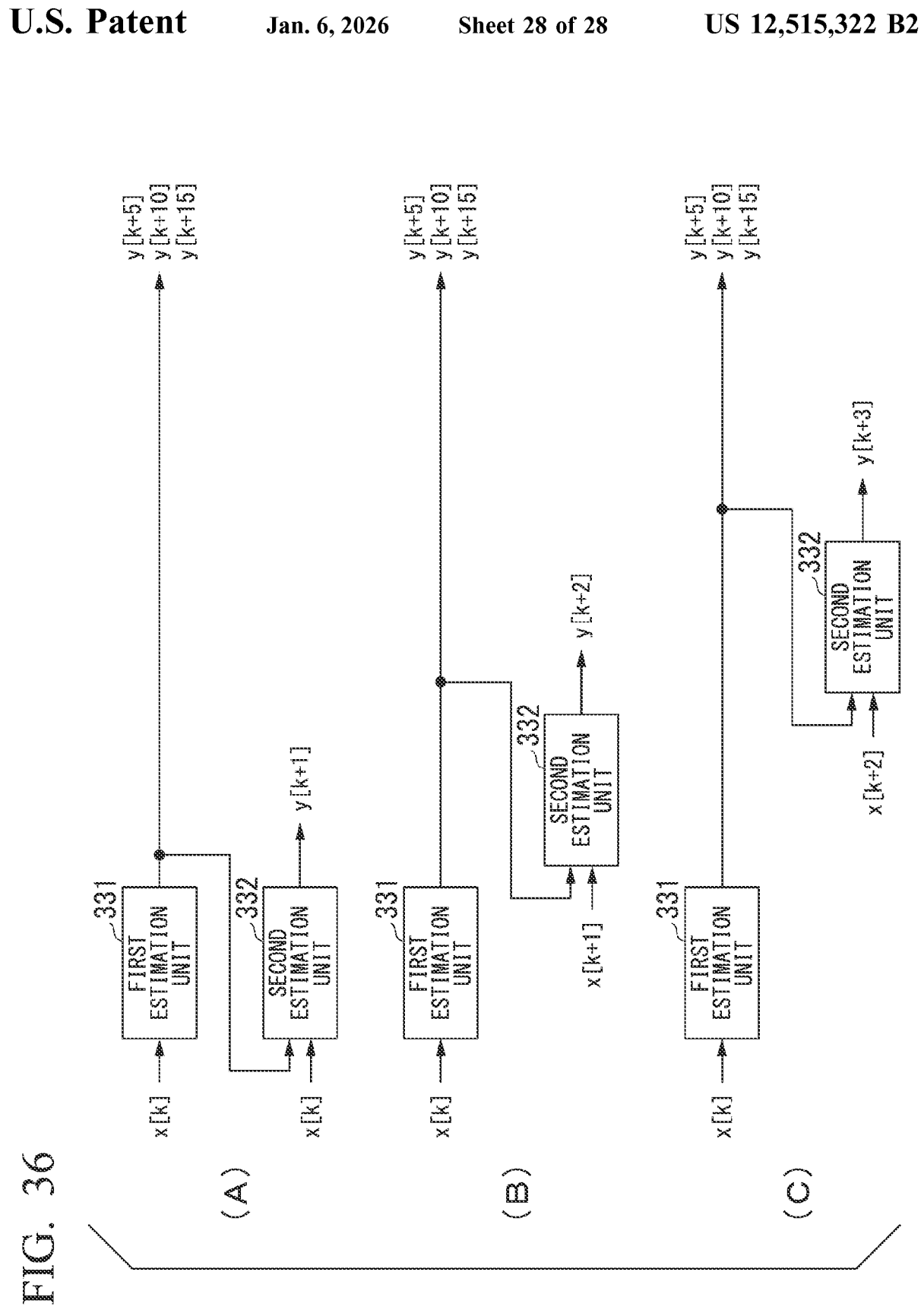
FIG. 36 is a diagram illustrating state prediction using a thirteenth embodiment of the present invention.

FIG. 36 is a diagram illustrating a state prediction according the thirteenth embodiment of the present invention. The thirteenth embodiment is different from the embodiment described above in that the first estimation unit 331 in the upper layer estimates the command information at a plurality of different time points, and the second estimation unit 332 estimates the command information for each command information at the plurality of time points thus estimated. The plurality of different time points may be time points in the past, present, or future.

An example in which the period of the upper layer is five times longer than that of the lower layer will be described. The first estimation unit 331 in an upper layer predicts states at three time points that are a time point k+5, a time point k+10, and a time point k+15.

FIG. 36(A) to FIG. 36(C) are diagrams illustrating estimation performed by the second estimation unit 332 in a lower layer in a period from a time point k to the time point k+5.

In FIG. 36(A), the second estimation unit 332 predicts a state at a time point k+1. In FIG. 36(B), the second estimation unit 332 predicts a state at a time point k+2. In FIG. 36(C), the second estimation unit 332 predicts a state at a time point k+3.

The second estimation unit 332 can prevent the interference between the upper layer and the lower layer by not updating the input from the first estimation unit 331 in the upper layer.

The first estimation unit 331 in an upper layer estimates the command information at a plurality of different time points, and the second estimation unit 332 estimates the command information for each command information at the plurality of time points thus estimated. Thus, information related to a change in the command information over time can be transmitted to the lower layer. Thus, for example, even when the output of the upper layer includes the position information only, the lower layer can derive the information related to the speed. Therefore, even in a case where the upper layer outputs command information using a sensor that is difficult to generate speed information, such as image information or GPS, appropriate command information can be transmitted to the layer.

The example in which of the set of input information and output information used when the first generation unit 311 generates the first trained model 321, the output information is the command information MASTER (t+T1) supplied to the slave device 10 should not be construed in a limiting sense, and the model may output information highly correlated with the command information MASTER (t+T1), such as state information SLAVE (t+T1).

The prediction of the state information SLAVE (t+T1) is particularly effective. This is because when the command information MASTER (t+T1) is predicted, whether the prediction result is correct cannot be confirmed because only the slave exists, that is, because the master is absent at the time of autonomous operation. On the other hand, when the state information SLAVE (t+T1) is predicted, since the slave exists at the time of autonomous operation, the prediction error can be evaluated by comparing the state information SLAVE (t+T1) with the response value obtained one step after. Thus, the prediction error can be reduced, and the prediction can be stabilized easily.

The first trained model 321 is not limited to an example of any trained model that can generate the command information MASTER (t+T1) from the state information SLAVE (t), and the model may output information highly correlated with the command information MASTER (t+T1) such as the state information SLAVE (t+T1). The command information MASTER (t+T1) output from the first trained model 321 in the above description may be replaced with the information highly correlated with the command information MASTER (t+T1).

The prediction of the state information SLAVE (t+T1) is particularly effective. This is because when the command information MASTER (t+T1) is predicted, whether the prediction result is correct cannot be confirmed because only the slave exists, that is, because the master is absent at the time of autonomous operation. On the other hand, when the state information SLAVE (t+T1) is predicted, since the slave exists at the time of autonomous operation, the prediction error can be evaluated by comparing the state information SLAVE (t+T1) with the response value obtained one step after. Thus, the prediction error can be reduced, and the prediction can be stabilized easily.

The n second trained models 322 used for estimation by the second estimation unit 332 are not limited to the case where n is a natural number of 2 or more, and may be one trained model, meaning that n may be a natural number of 1 or more.

In the present embodiment, the first estimation unit 331 and the second estimation unit 332 use different trained models. Therefore, in the training stage, the first trained model 321 used by the first estimation unit 331 and the second trained model 322 used by the second estimation unit 332 can be trained separately and independently, and thus the design cost can be significantly reduced. When training is required for a new operation, the second trained model 322 is newly trained, and the first trained model 321 is used as is, whereby the amount of training can be reduced. Similarly, the amount of training can be also reduced by newly training the first trained model 321 and using the second trained model 322 as is.

The change control unit 334 in the estimation phase execution unit 33H of the information processing device 30H may change one or both of the unit of time τ1 and the unit of time τ2, based on the degree of hardness/softness of a contact target object to be simply contacted, in addition to the object to be target of the holding operation, the food material to be target of the cooking operation, the writing material and paper for writing to be target of the writing and drawing operation, and the object to be the target of the polishing operation. Thus, the operation of the control target device (master device and slave device) is not limited to the holding operation, and includes a simple contacting operation.

Example of Implementation Using Software

The control blocks of the information processing device 30 and 30B to 30L (in particular, the training phase execution unit 31 and the estimation phase execution unit 33) may be implemented by logic circuits (hardware) formed in integrated circuits (IC chips) or the like, or may be implemented by software.

In the latter case, the information processing devices 30 and 30B to 30L include a computer that executes a command of a program that is software for implementing each function. The computer includes, for example, one or more processors and a computer-readable recording medium storing the program. The object of the present invention is achieved with the processor in the computer reading the program from the recording medium and executing the program. As the processor, for example, a central processing unit (CPU) may be used. Examples of the recording medium include a "non-transitory tangible medium" such as a read only memory (ROM), as well as a tape, a disk, a card, a semiconductor memory, and a programmable logic circuit. Furthermore, a random access memory (RAM) or the like onto which the program is to be loaded may be further provided. The program may be supplied to the computer using an any transmission medium (such as a communication network or a broadcast wave) with which the program can be transmitted. Note that one aspect of the present invention can also be implemented in a form of a data signal embedded in a carrier wave, which is form with the program embodied through electronic transmission.

The present invention is not limited to each of the above-described embodiments. It is possible to make various modified examples within the scope of the claims. An embodiment obtained by appropriately combining technical elements each disclosed in different embodiments falls also within the technical scope of the present invention.

REFERENCE SIGNS LIST 1, 1B, 1C, 1D, 1E, 1F, 1G, 1H, 1I, 1J, 1K, 1L, 2 System
10 Slave device
10B Control target device
20 Master device
30 30B, 30C, 30D, 30E, 30F, 30G, 30H, 30I, 30K, 30K, 30L Information processing device
31 Training phase execution unit
32 Storage unit
33 Estimation phase execution unit
40 Input device
111, 211 Base part
112, 212 Rotating part
113, 213 First arm part
114, 214 Second arm part
311, 311D, 311F First generation unit
312 Second generation unit
321, 321D, 321F First trained model
322 Second trained model
323 Training dataset
324 Third trained model
331 First estimation unit
332 Second estimation unit
333 Operation control unit
610, 610-1, 610-2, 610-3 Operation generator

The invention claimed is:

1. An information processing device, comprising a processor configured to execute a program to:
estimate command information per first unit of time, by using a first trained model that derives the command information to be supplied to a control target device from information indicating a state of the control target device, the information being output from the control target device that operates in accordance with the command information;
estimate the command information per second unit of time shorter than the first unit of time, by using a second trained model that derives the command information to be supplied to the control target device from the information indicating the state output from the control target device and the command information derived as a result of input of the information indicating the state to the first trained model; and
operate the control target device by using the command information estimated by the second estimation unit.

2. The information processing device according to claim 1, wherein
the command information is information to be issued from a device that outputs the command information, and
information input to the second trained model includes the command information derived by the first trained model and the information indicating the state.

3. The information processing device according to claim 1, wherein data is input to the second trained model, the data being obtained by performing conversion to achieve no relationship between a set of the information indicating the state output from the control target device and information output from the first trained model.

4. The information processing device according to claim 1, wherein
a device that outputs the command information and the control target device each includes a robot arm, and
the command information and the information indicating the state each includes information indicating an operation of the robot arm.

5. The information processing device according to claim 1, wherein
a device that outputs the command information is a master device that operates in accordance with a user operation,
the control target device is a slave device that operates in accordance with the command information output from the master device, and
the first trained model and the second trained model are trained using the command information and the information indicating the state that are collected in a master-slave system including the master device and the slave device.

6. An information processing device, comprising a processor configure to execute a program to:
use a set of information indicating a state of a control target device that operates in accordance with command information and output from the control target device, and the command information to be supplied to the control target device, to generate a first trained model trained for a correlation between the information indicating the state and the command information;
use a set of the command information to be supplied to the control target device and input information including information indicating a relationship between the information indicating the state output from the control target device and the command information derived as a result of input of the information indicating the state to the first trained model, to generate a second trained model trained for a correlation between the input information and the command information, estimate the command information by inputting the information indicating the state output from the control target device, to the first trained model per first unit of time;

estimate the command information by inputting, to the second trained model per second unit of time shorter than the first unit of time, input data including information indicating a relationship between the information indicating the state output from the control target device, and the command information derived as a result of input of the information indicating the state to the first trained model; and operate the control target device by using the command information estimated by the second estimation unit.

7. The information processing device according to claim 6, wherein a device that outputs the command information is a master device that operates in accordance with a user operation, the control target device is a slave device that operates in accordance with the command information output from the master device, generates the first trained model using the command information and the information indicating the state that are collected in a master-slave system including the master device and the slave device, and generates the second trained model using the command information and the information indicating the state that are collected in the master-slave system.

8. The information processing device according to claim 1, wherein the first trained model is a trained model that derives, from input data including the information indicating the state and information, including an operation speed, for defining an operation of the control target device, the command information to be supplied to the control target device after the control target device outputs the information indicating the state.

9. The information processing device according to claim 8, wherein the information including the operation speed includes information indicating a frequency representing an operation periodicity or an operation execution time of the control target device.

10. The information processing device according to claim 8, wherein the first trained model is a trained model that derives, from the input data, the command information to be supplied to the control target device after the control target device outputs the information indicating the state and a predetermined unit of time elapses.

11. The information processing device according to claim 6, wherein the first trained model is a trained model that derives as output data, from input data including the information indicating the state and information, including an operation speed, for defining an operation to be instructed to the control target device, the command information to be supplied to the control target device after the control target device outputs the information indicating the state, and generates the first trained model by using the command information, the information indicating the state, and information including the operation speed that are collected as a result of operation of the control target device while the operation speed of the control target device is changed.

12. The information processing device according claim 1, wherein the first trained model is a trained model trained using, as input information, information indicating a second state derived by a third trained model that derives, from the command information, the information indicating the second state, the second state being output from the control target device after the command information is supplied to the control target device.

13. A method executed by an information processing device, the method comprising:

estimating command information per first unit of time, by using a first trained model that derives the command information to be supplied to a control target device from information indicating a state of the control target device, the information being output from the control target device that operates in accordance with the command information;

estimating the command information per second unit of time shorter than the first unit of time, by using a second trained model that derives the command information to be supplied to the control target device from information indicating a relationship between the information indicating the state output from the control target device and the command information derived as a result of input of the information indicating the state to the first trained model; and operating the control target device by using the command information estimated in estimating the command information per the second unit of time.

14. The information processing device according to claim 1, wherein two or more (n) of the second trained models are used to estimate the command information, where n is a natural number equal to or greater than two, and the two or more (n) of the second trained models are hierarchically used, and information indicating a relationship corresponding to the command information derived from the second trained model in each layer corresponds to input information for the second trained model in a lower layer than the second trained model.

15. The information processing device according to claim 1, wherein the control target device is a device that performs work on a target object, and changes one or both of the first unit of time and the second unit of time depending on hardness of the target object.

16. The information processing device according to claim 1, wherein the first trained model is a trained model that derives, from the information indicating the state, information indicating a second state of the control target device after a predetermined period of time elapses and the command information, and is trained using, as input information, the information indicating the second state derived by the first trained model.

17. The information processing device according to claim 1, wherein the first trained model is a trained model that derives, from the command information and the information indicating the state, information indicating a second state of the control target device after a predetermined period of time elapses and the command information, and is trained using, as input information, the command information and the information indicating the second state that are derived by the first trained model.

18. The information processing device according to claim 14, wherein the two or more (n) of the second trained models are different from each other in operating frequency.

19. The information processing device according claim 1, wherein the input information is a value quantitatively expressed.

20. The information processing device according to claim 1, wherein
- the control target device holds a holding target object or contacts a contact target object, the first trained model and the second trained model store an operation of holding the holding target object or contacting the contact target object, and
- the first trained model or the second trained model is trained using the operation of holding the holding target object or contacting the contact target object depending on hardness of the holding target object or the contact target object.

21. The information processing device according to claim 20, wherein
- the first trained model is trained for an operation in a case where the holding target object is a soft object,
- the second trained model is trained for an operation in a case where the holding target object is a hard object, and
- the first trained model and the second trained model are different from each other in operating frequency.

22. A program for causing a computer to operate as the information processing device described in claim 1, the program causing the computer to operate as each of the units.

23. The information processing device according claim 1, wherein
- a plurality of pieces of the command information are estimated at a plurality of time points, and
- a piece of the command information for each of the plurality of pieces is estimated of the command information estimated at each of the plurality of time points.

* * * * *